(12) United States Patent
Choi et al.

(10) Patent No.: US 11,283,819 B2
(45) Date of Patent: *Mar. 22, 2022

(54) METHOD AND SYSTEM FOR VEHICLE CYBER-ATTACK EVENT DETECTION

(71) Applicant: The Boeing Company, Chicago, IL (US)

(72) Inventors: Jai J. Choi, Sammamish, WA (US); Eric J. Martens, Crestwood, MO (US); Douglas A. Stuart, St. Charles, MO (US); Ramkumar Balasubramanian, Madison, AL (US); Mingyan Li, Bellevue, WA (US); Brett M. Wilson, Seattle, WA (US); Li Yang, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/875,191

(22) Filed: May 15, 2020

(65) Prior Publication Data

US 2020/0280571 A1 Sep. 3, 2020

Related U.S. Application Data

(63) Continuation of application No. 15/846,647, filed on Dec. 19, 2017.

(51) Int. Cl.
*H04L 29/06* (2006.01)
*G06N 3/08* (2006.01)
(Continued)

(52) U.S. Cl.
CPC .......... *H04L 63/1416* (2013.01); *G06N 3/04* (2013.01); *G06N 3/08* (2013.01); *H04L 63/1425* (2013.01);
(Continued)

(58) Field of Classification Search
CPC . H04L 63/1416; H04L 63/14; H04L 63/1441; G06N 3/08
See application file for complete search history.

(56) References Cited

U.S. PATENT DOCUMENTS 7,269,411 B2  9/2007  Corman et al.
9,633,106 B1  4/2017  Saurabh et al.
(Continued)

FOREIGN PATENT DOCUMENTS

CN  105208000  12/2015
CN  106254318  12/2016
(Continued)

OTHER PUBLICATIONS

Kim, Yoon. "Convolutional Neural Networks for Sentence Classification". Empirical Mthods in Natural Language Processing, Harvard University, 2014, pp. 1746-1751. DOI: 10.3115/v1/D14-1181.
(Continued)

*Primary Examiner* — Olugbenga O Idowu
(74) *Attorney, Agent, or Firm* — Perman & Green, LLP

(57) ABSTRACT

A multiple vehicle cyber-attack detection system including a vehicle operations center coupled to and monitoring vehicles, where each operations center includes a cyber-attack alert module. A vehicle cyber-attack detection system is in communication with each operations center and includes a first tier security module coupled to an onboard system of each vehicle and receives system log data generated by the onboard system. The first tier security module extracts extracted features from a time series of overlapping windowed system log data generated from the system log data with natural language processing and includes a first cyber-attack anomaly detection module that identifies a first cyber-attack based on system entropy measurements. A second cyber-attack anomaly detection module includes a deep learning component that identifies a second cyber-
(Continued)

attack based on classification of the extracted features. Each cyber-attack alert module generates a notification of the first cyber-attack and/or the second cyber-attack on a user interface.

20 Claims, 11 Drawing Sheets

(51) Int. Cl.
  *G06N 3/04* (2006.01)
  *H04W 12/12* (2021.01)
  *H04W 4/48* (2018.01)
  *H04L 67/12* (2022.01)

(52) U.S. Cl.
  CPC ......... *H04L 63/1441* (2013.01); *H04W 12/12* (2013.01); *H04L 67/12* (2013.01); *H04W 4/48* (2018.02)

(56) References Cited

U.S. PATENT DOCUMENTS

| | | | |
|---|---|---|---|
| 9,661,010 | B2 | 5/2017 | Thakur et al. |
| 2017/0134400 | A1* | 5/2017 | Nguyen .............. H04L 63/1416 |
| 2017/0200323 | A1 | 7/2017 | Allouche et al. |
| 2019/0108341 | A1* | 4/2019 | Bedhapudi .......... G06F 16/1752 |

FOREIGN PATENT DOCUMENTS

| | | |
|---|---|---|
| CN | 107241352 | 10/2017 |
| WO | 2007128975 | 11/2007 |

OTHER PUBLICATIONS

Splunk Products, https://www.splunk.com/en_us/products.html.
Min Du et al. "DeepLog: Anomaly Detection and Diagnosis from System Logs through Deep Learning", Proceedings of the 2017 ACM SIGSAC Conference on Computer and Communications Security, CCS 2017, Jan. 2017, pp. 1285-1298, New York, NY.
Agogino et al. "Entropy Based Anomaly Detection Applied to Space Shuttle Main Engines", 2006 IEEE Aerospace Conference, Big Sky, Montana; Mar. 2006, pp. 1-7.
Srivastava et al. "Enabling the Discovery of Recurring Anomalies in Aerospace Problem Reports Using High-Dimensional Clustering Techniques", 2006 IEEE Aerospace Conference, Big Sky, Montana; Mar. 2006, pp. 1-17.
European Search Report, European Application No. 18212962, dated Apr. 25, 2019.

* cited by examiner

METHOD AND SYSTEM FOR VEHICLE CYBER-ATTACK EVENT DETECTION

CROSS-REFERENCE TO RELATED APPLICATIONS

This application is a continuation of and claims the benefit of U.S. Non-Provisional patent application Ser. No. 15/846,647 filed on Dec. 19, 2017 (now U.S. Pat. No. 10,659,477 issued on May 19, 2020), the disclosure of which is incorporated by reference herein in its entirety.

BACKGROUND

1. Field

The exemplary embodiments generally relate to vehicle onboard networked systems cyber-attack event detection and more particularly to cyber-attack event detection with scalable system log analytics.

2. Brief Description of Related Developments

Generally, analytic tools for determining security violations perform offline data mining using profiles/signatures and explicit rules to search for and examine security violations. Based on historic investigation or intelligence about security logs, an expert system can create rule-bases that include a collection of profiles/signatures corresponding to the security violations. Final decisions about any security incidents are generally made through a threshold value created either statistically or by subject matter experts. For example, if a number of certain high priority log events exceeds a predetermined frequency during a predetermined time period (e.g., a week, a month, etc.), a follow-up manual investigation may be suggested by the conventional analytic tools. The follow-up investigations are conducted manually applying the same search/data mining tools with yet more complex queries to extract the detailed log content for situation assessment.

Generally, the offline and threshold-based analytic tools have several limitations. For example, the threshold method is generally not effective against zero-day cyber-attacks and previously unseen attacks (noting that the sophistication of cyber-attackers is ever increasing and their attacks leave fewer traces due, e.g., to low-intensity, polymorphism, and obfuscation techniques). In addition, offline (e.g., delayed) cyber security determinations may miss a window of opportunity to instigate defensive measures against any cyber-attack. Threshold cyber-attack detection methods are also generally not scalable where the rules and thresholds for one type of cyber-attack may not apply to another different type of cyber-attack. The offline and threshold-based analytic tools also have ever increasing costs due to the manual decision making required to complete the follow-up investigations.

Other conventional approaches to detecting cyber-security events include methods that use clustering or proximity models and classification functions to determine outliers in a user behavior or in a system data log feature space. Clustering or proximity based outlier detection generally depends upon the proximity of an outlier deviating significantly from that of most other data. As such, it is difficult to formulate meaningful semantic proximity or context/semantic distance for vehicle onboard network security log data. In addition, there may be little to no information or knowledge about the number of available data clusters prior to the clustering or proximity based outlier detection.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a vehicle cyber-attack detection system comprising: at least one first tier security module being coupled to at least one onboard system of a respective vehicle and being configured so as to receive system log data generated by the at least one onboard system of the respective vehicle, the at least one first tier security module being configured to extract extracted features from the system log data with natural language processing and including a first cyber-attack anomaly detection module configured to identify a first cyber-attack based on system entropy measurements determined by the first cyber-attack anomaly detection module from the extracted features, and a second cyber-attack anomaly detection module that includes a deep learning component configured to identify a second cyber-attack based on classification of the extracted features; and a cyber-attack alert module being coupled to the at least one first tier security module and including a user interface, the cyber-attack alert module being configured to generate a notification of one or more of the first cyber-attack and the second cyber-attack on the user interface to effect cyber-attack diagnostics and remediation by vehicle personnel.

Another example of the subject matter according to the present disclosure relates to a vehicle cyber-attack detection system comprising: a hierarchical arrangement of cyber-attack detection modules, the hierarchical arrangement of cyber-attack detection modules includes at least one first tier security module coupled to at least one onboard system of a respective vehicle and being configured so as to receive system log data generated by the at least one onboard system of the respective vehicle, the at least one first tier security module being configured to extract extracted features from the system log data with natural language processing for one or more of behavior based cyber-attack detection and classification based cyber-attack detection, and at least one second tier security module coupled to the at least one first tier security module and at least a vehicle operator database, the at least one second tier security module being configured to correlate a cyber-attack identified by the at least one first tier security module with vehicle operational data to identify at least one cyber-attack trend; and a cyber-attack alert module being coupled to one or more of the at least one first tier security module and the at least one second tier security module, the cyber-attack alert module including a user interface and being configured to generate one or more of a notification of one or more of the cyber-attack identified by the at least one first tier security module and the at least one cyber-attack trend identified by the at least one second tier security module on the user interface to effect cyber-attack diagnostics and remediation by vehicle personnel.

Still another example of the subject matter according to the present disclosure relates to a method for vehicle cyber-attack detection using a vehicle cyber-attack detection system, the method comprising: receiving, with at least one first tier security module coupled to at least one onboard system of a respective vehicle, system log data generated by the at least one onboard system of the respective vehicle; extracting, with the at least one first tier security module, extracted features from the system log data with natural language processing; identifying a first cyber-attack, with a first cyber-attack anomaly detection module of the at least one first tier security module, based on system entropy measurements determined by the first cyber-attack anomaly detection module from the extracted features; identifying a second cyber-attack, with a second cyber-attack anomaly detection module of the at least one first tier security module that includes a deep learning component, based on classification of the extracted features; and generating a notification of one or more of the first cyber-attack and the second cyber-attack on a user interface of a cyber-attack alert module that is coupled to the at least one first tier security module to effect cyber-attack diagnostics and remediation by vehicle personnel.

BRIEF DESCRIPTION OF THE DRAWINGS

Figure 1:
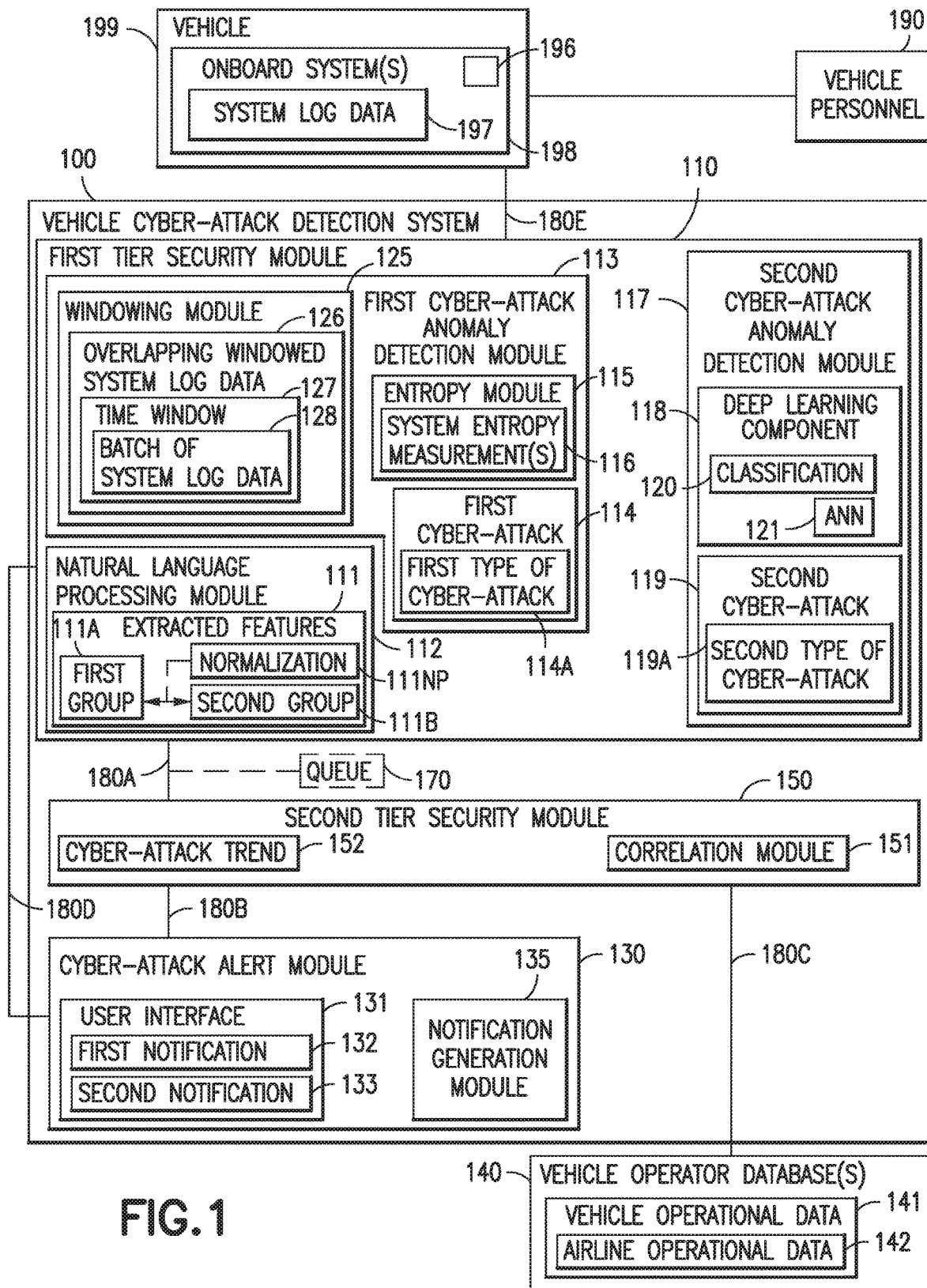
Figure 2:
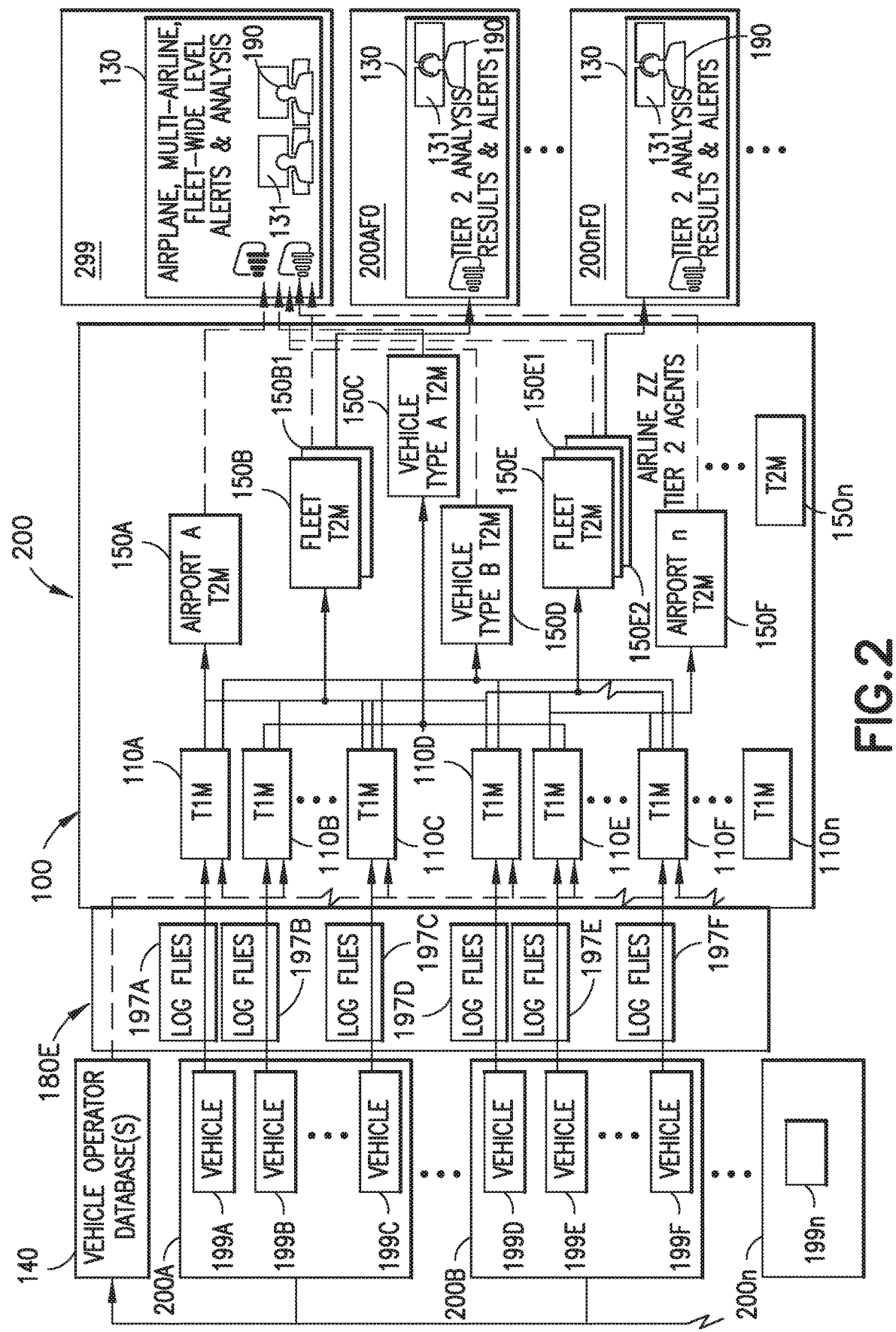
Figure 3A:
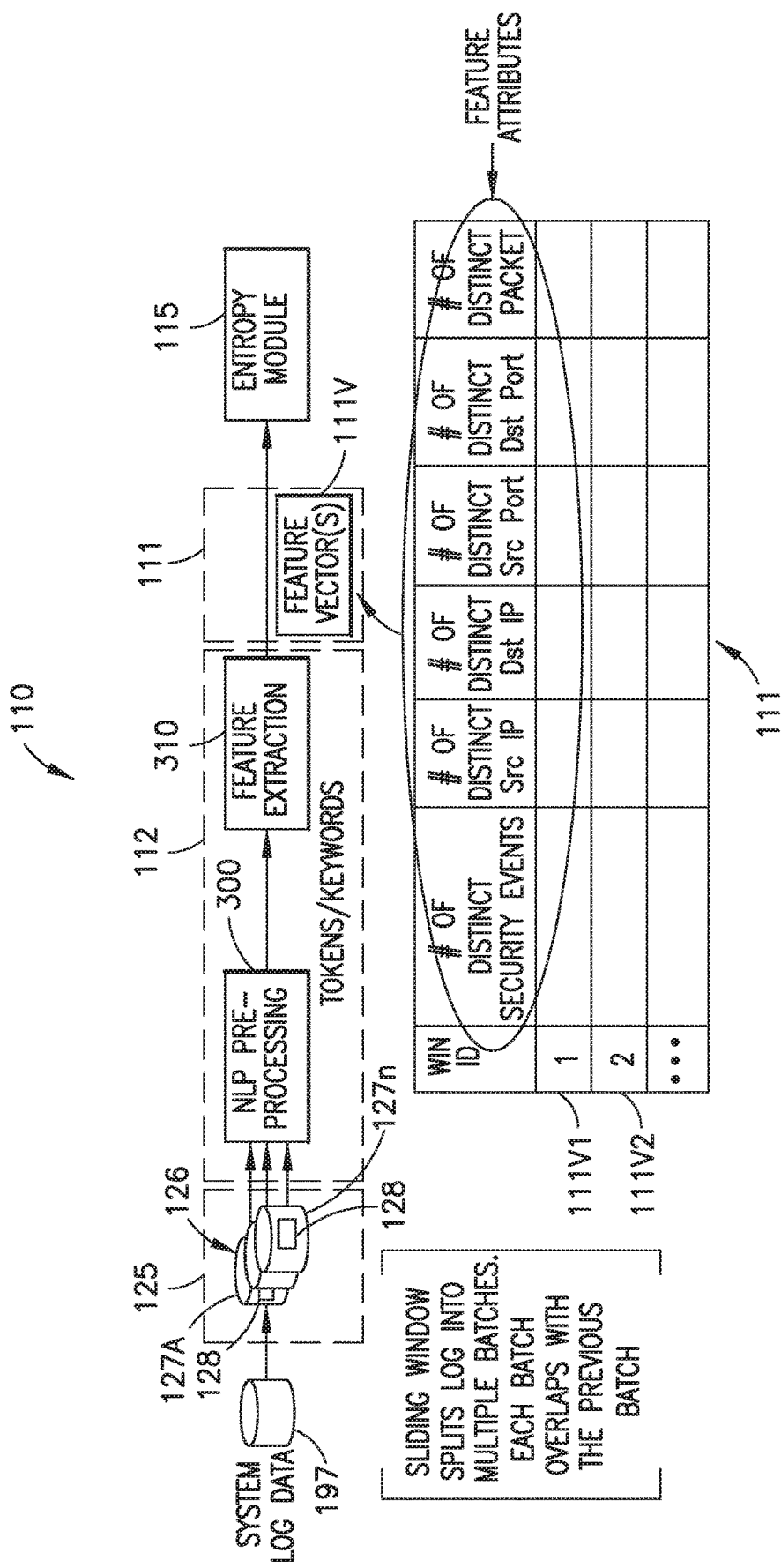
Figure 3B:
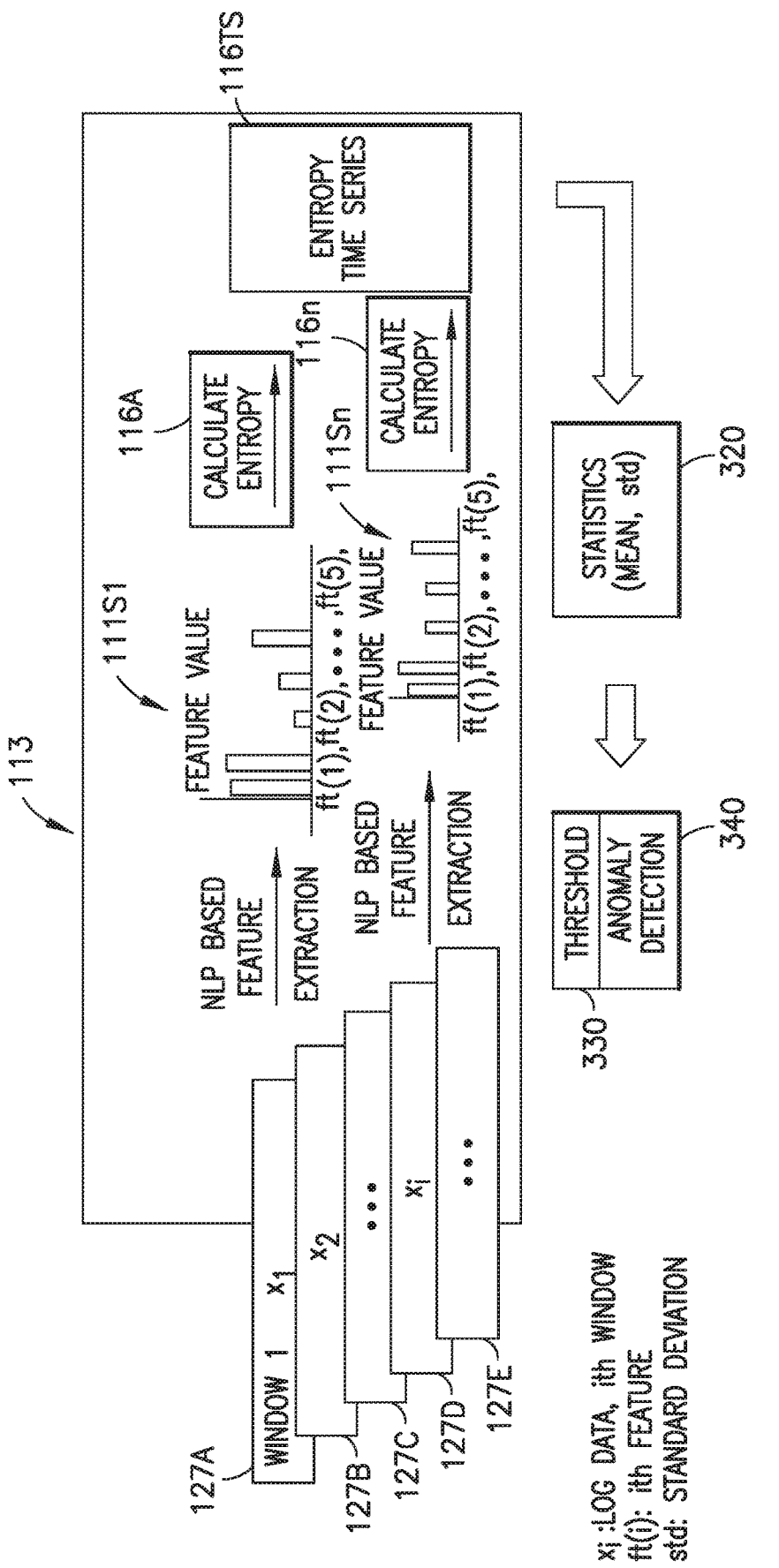
Figure 4:
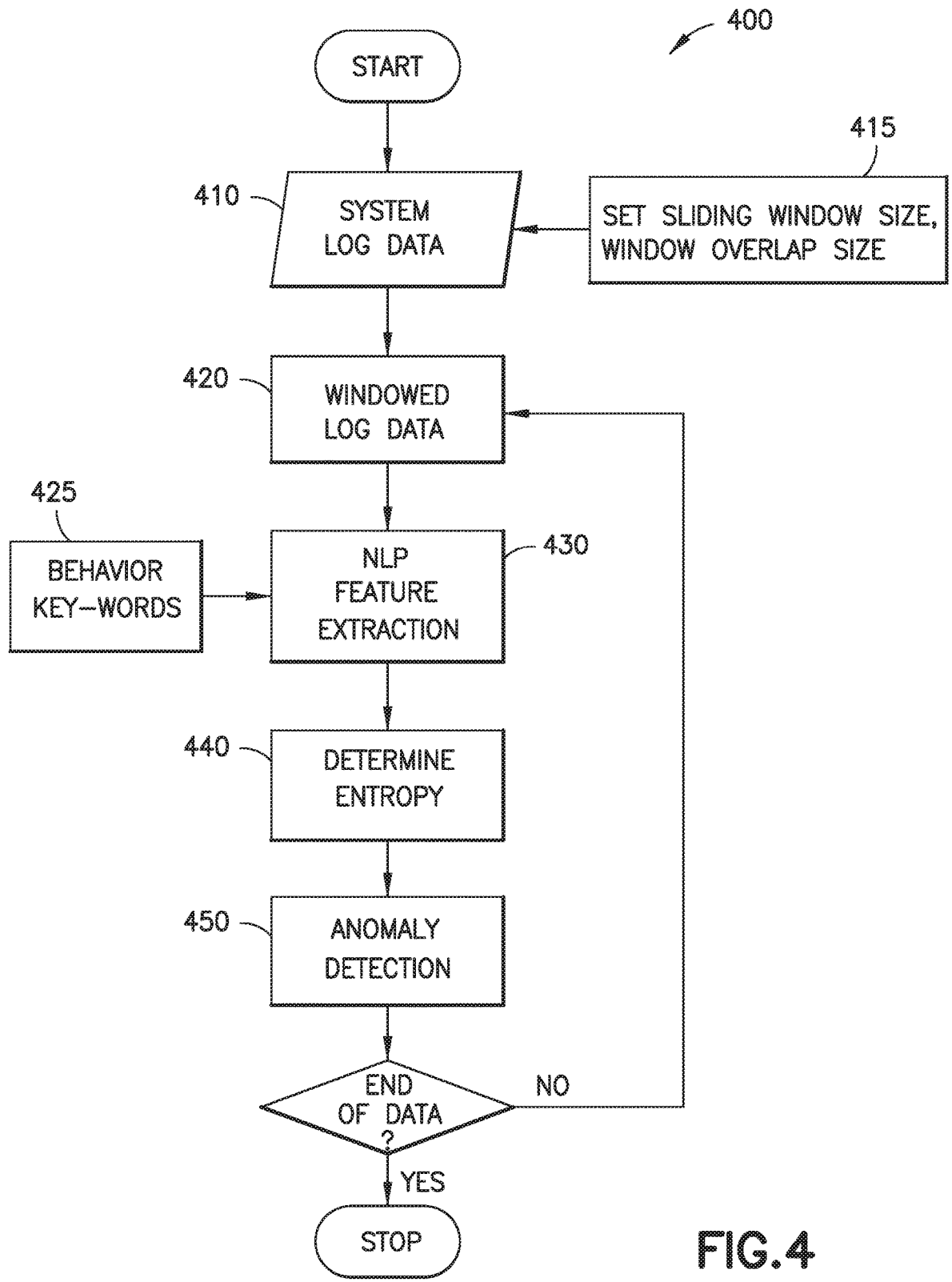
Figure 5B:
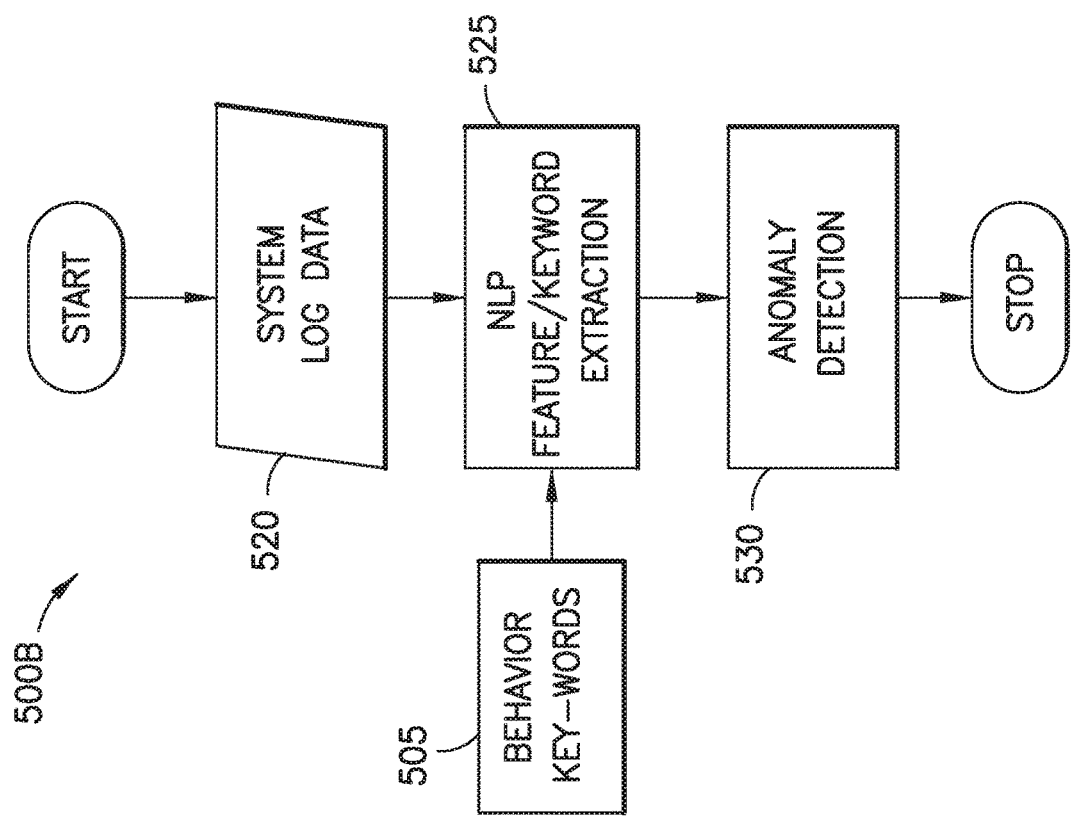
Figure 5A:
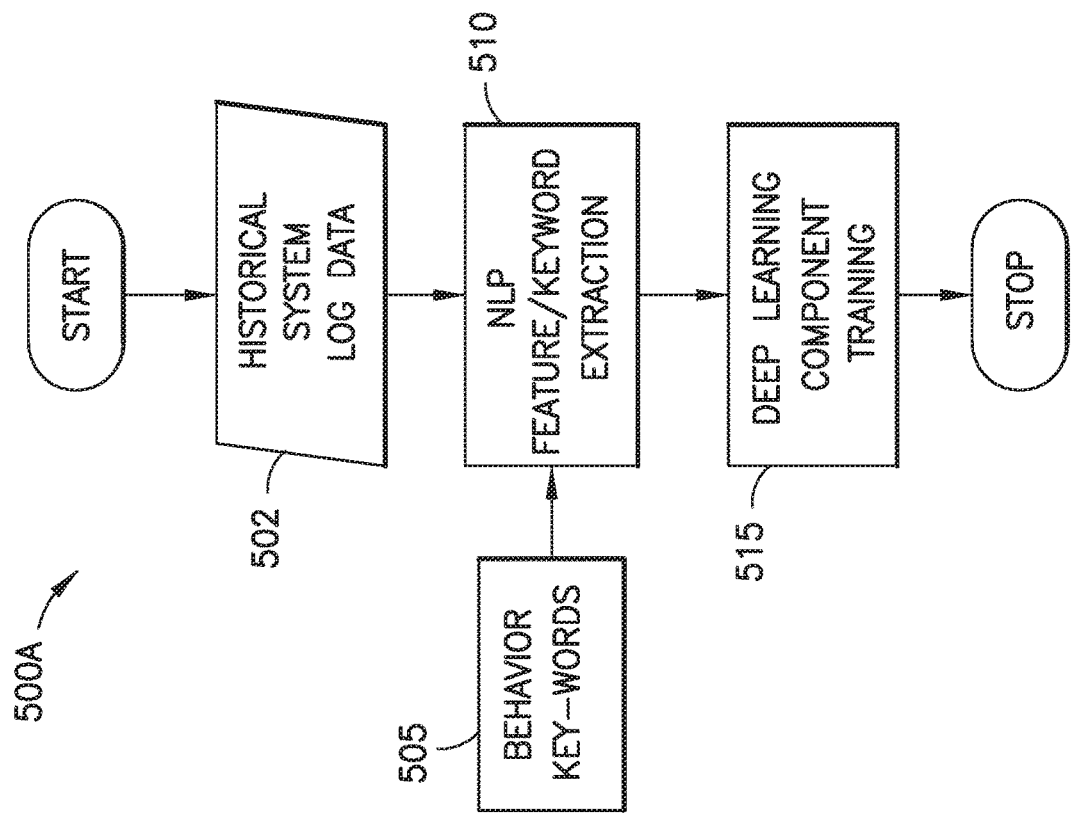
Figure 6:
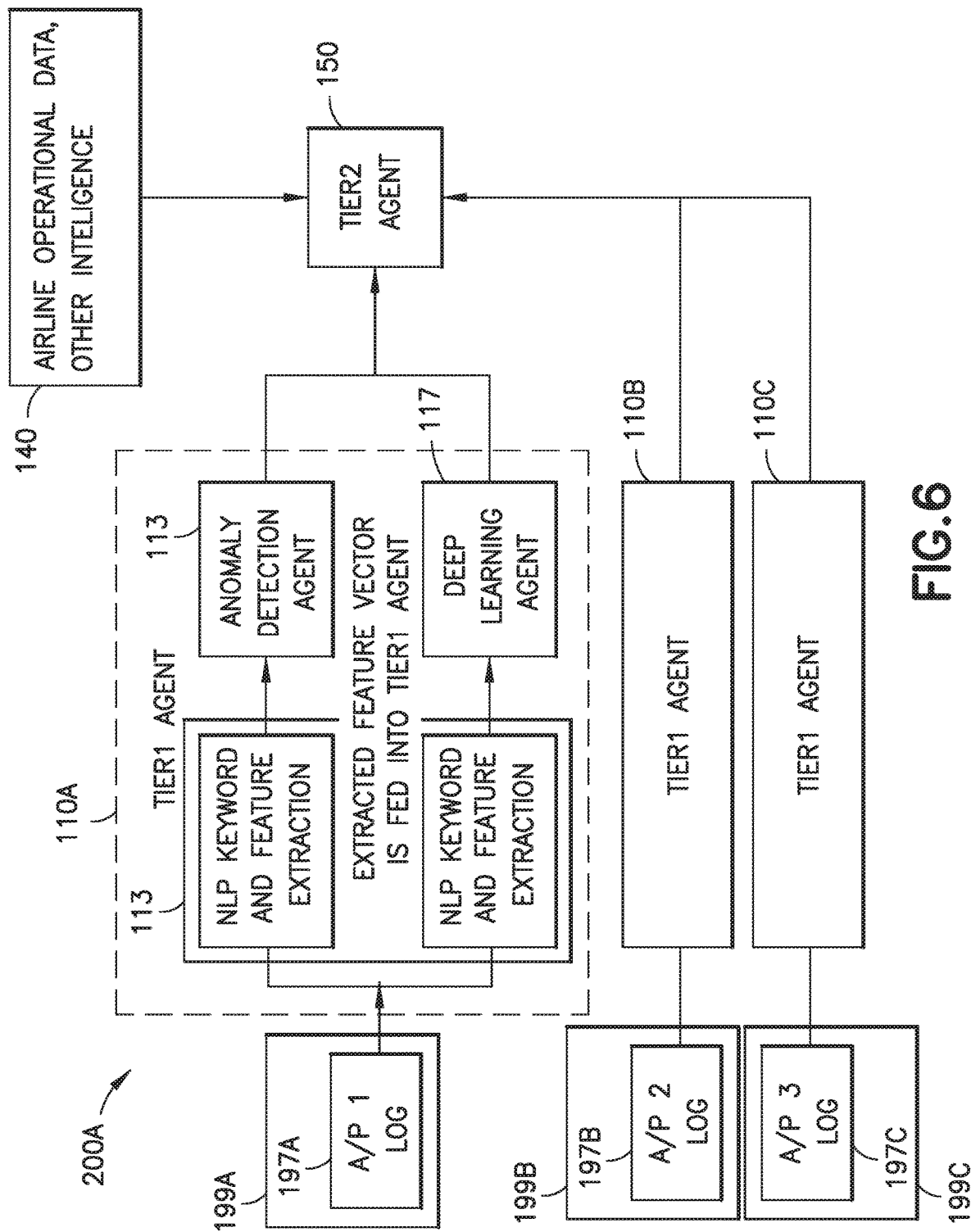
Figure 7:
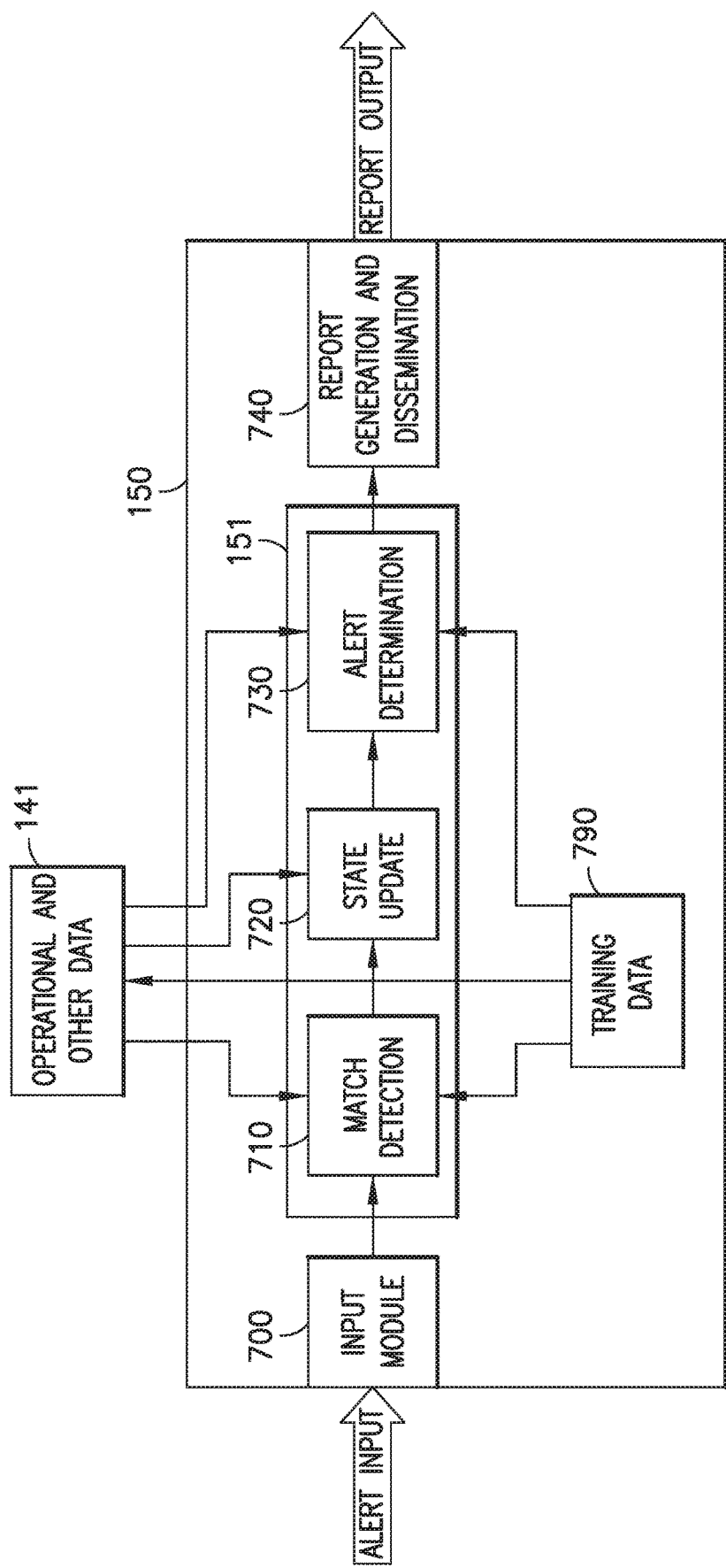
Figure 8:
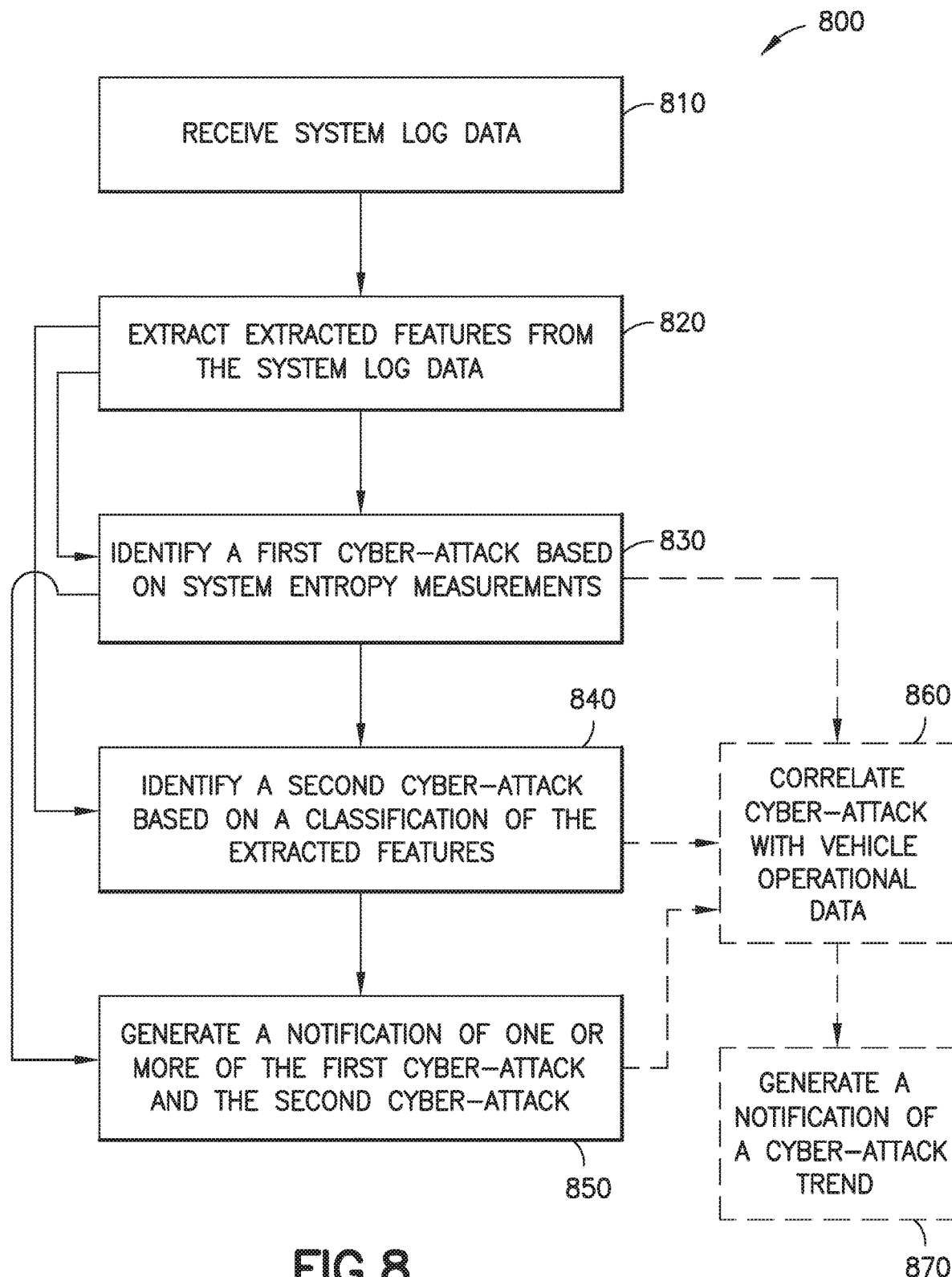
Figure 9:
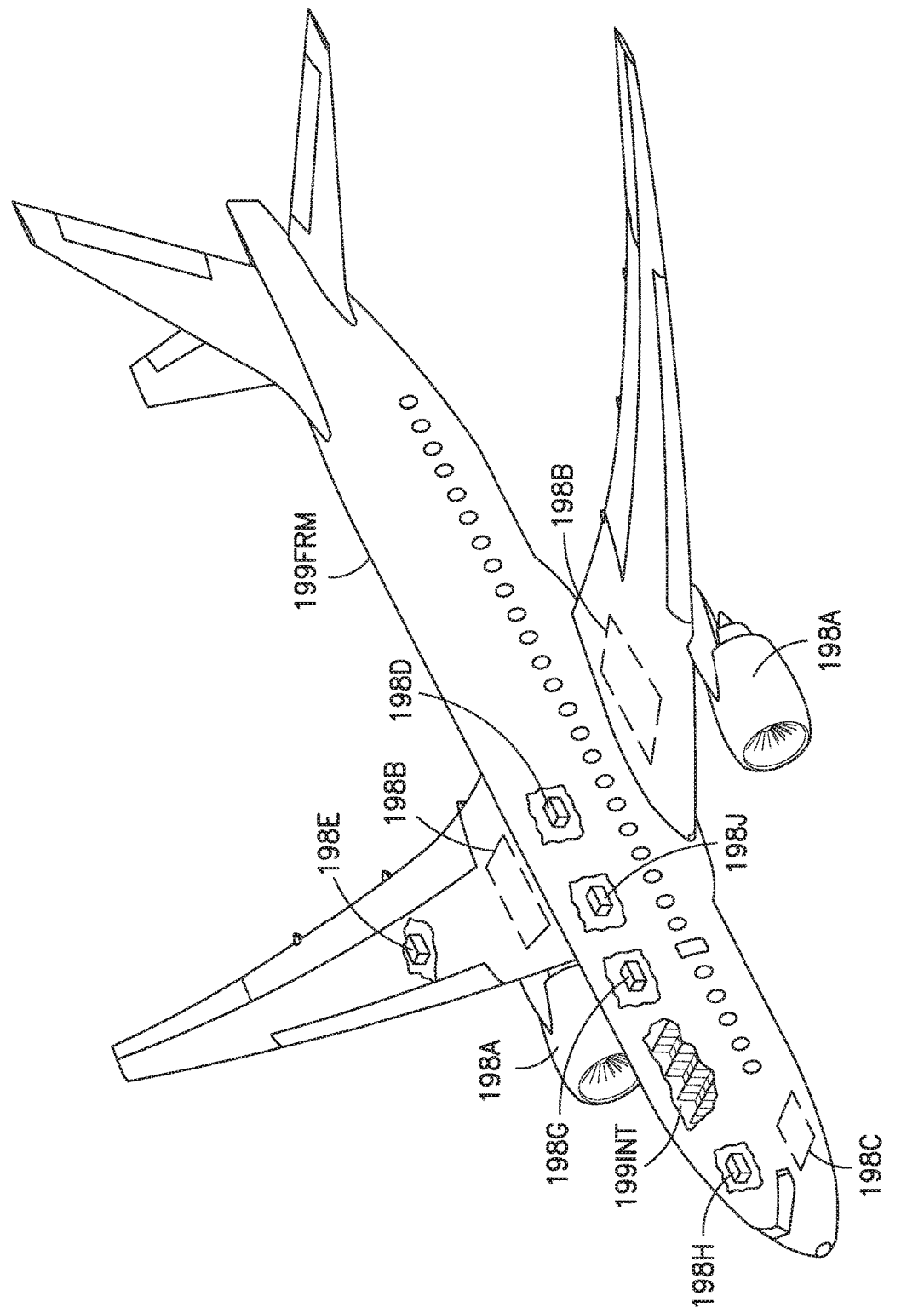
Figure 10:
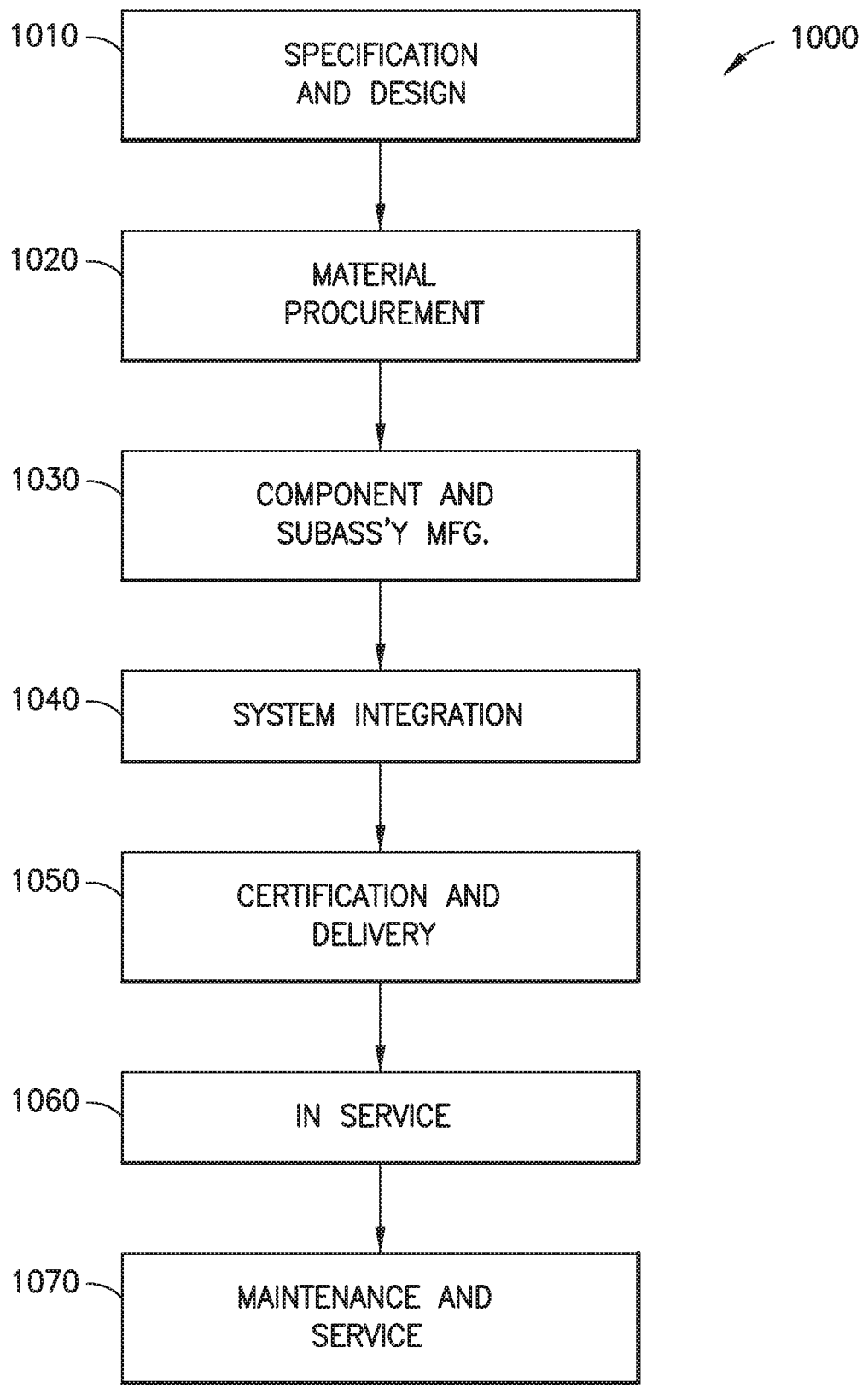

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of a vehicle cyber-attack detection system in accordance with aspects of the present disclosure;

FIG. 2 is a schematic illustration of an exemplary implementation of the vehicle cyber-attack detection system of FIG. 1 in accordance with aspects of the present disclosure;

FIG. 3A is a schematic illustration of a portion of the vehicle cyber-attack detection system of FIG. 1 in accordance with aspects of the present disclosure;

FIG. 3B is a schematic illustration of a portion of the vehicle cyber-attack detection system of FIG. 1 in accordance with aspects of the present disclosure;

FIG. 4 is a flow diagram for a method for determining a first cyber-attack in accordance with aspects of the present disclosure;

FIG. 5A is a flow diagram for a method for training second cyber-attack anomaly detection module, of the vehicle cyber-attack detection system, in accordance with aspects of the present disclosure;

FIG. 5B is a flow diagram for a method for determining a second cyber-attack in accordance with aspects of the present disclosure;

FIG. 6 is a schematic illustration of an exemplary implementation of the vehicle cyber-attack detection system of FIG. 1 in accordance with aspects of the present disclosure;

FIG. 7 is a schematic illustration of a portion of the vehicle cyber-attack detection system of FIG. 1 in accordance with aspects of the present disclosure;

FIG. 8 is a flow diagram for a method for vehicle cyber-attack detection in accordance with aspects of the present disclosure;

FIG. 9 is an exemplary illustration of the vehicle in FIG. 1 in accordance with aspects of the present disclosure; and FIG. 10 is an exemplary flow diagram of an aircraft production and service methodology.

DETAILED DESCRIPTION

Referring to FIGS. 1 and 9, the aspects of the present disclosure will be described with respect to a fixed wing aircraft, such as aircraft 199A for exemplary purposes only. However, it should be understood that the aspects of the present disclosure may be deployed in any suitable vehicle 199, including but not limited to aerospace vehicles, rotary wing aircraft, unmanned aerial vehicles (UAVs), fixed wing aircraft, lighter than air vehicles, maritime vehicles, and automotive vehicles. In one aspect, the vehicle 199 includes one or more onboard systems 198 each having one or more (e.g., a plurality of) respective components (e.g., engines and components thereof, air conditioning systems and components thereof, etc.). The onboard systems 198 may include avionics systems 198H, propulsion systems 198A, hydraulic systems 198E, electrical systems 198D, main landing gear systems 198B, and nose landing gear system 198C. The vehicle 199 may also include an interior 199INT having an environmental system 198G and passenger information/entertainment systems 198J. In other aspects, the onboard systems 198 may also include one or more control systems coupled to an airframe 199FRM of the vehicle 199, such as for example, flaps, spoilers, ailerons, slats, rudders, elevators, and trim tabs. One or more of these onboard systems 198 may have an associated system control unit(s) 196 that may be susceptible to a cyber-attack. As such reference to the onboard systems 198 herein is intended to be inclusive of any system control unit(s) associated with one or more of the respective onboard systems 198.

Due to, for example, an increasing reliance on onboard systems 198 in vehicles such as vehicle 199 that may be continually or intermittently connected to a communication network (such as an Internet/cloud based communication network), the vehicle 199 may face potential cyber-attacks including, for example, but not limited to zero-day attacks, denial of service, sophisticated/advanced persistent malware, structured query language (SQL) injection attacks, session hijacking and man-in-the-middle attacks, network probing, brute-force cracking, ransomware, and insider threats. Generally, the onboard systems 198 of the vehicle 199, such as an E-enabled vehicle, produces system log data 197 that capture a variety of information such as system health, data load, file service, network messages, network performance, communication status, security events, etc. As used herein, an E-enabled vehicle is a vehicle that uses Transmission Control Protocols (TCP) and/or Internet Protocols (IP), or any other suitable communication protocol, to interconnect one or more of passenger information systems, entertainment systems, and the main backbone of vehicle communications such as, in the case of aircraft, avionics systems, in a manner that virtually makes the vehicle an interconnected network domain server.

The system log data 197 generated by the onboard systems 198 include a collection of security related messages that provide an opportunity to identify security risks of the subject vehicle 199. However, the system log data 197 includes limited information about cyber-attacks that is available for analysis because the conventional cyber-attack infrastructure defenses are effective so there are few examples of successful attacks to provide training data. Further, the system log data 197 are generally recorded in text log messages that provide a description of relevant events rather than network traffic data, where the networked traffic data are used by conventional cyber-attack infrastructure defenses (e.g., the conventional cyber-attack infrastructure defenses generally are not capable of analyzing the text log messages). The aspects of the present disclosure provide for a methods and systems for cyber-attack event detection that analyzes the text log messages found in the system log data 197. For example, the aspects of the present disclosure include a hierarchical or tiered vehicle cyber-attack detection system 100 that extracts one or more sets of feature vectors (e.g., extracted features) from the text log messages based on behavior attributes generated by natural language processing for the detection of one or more cyber-attacks. The vehicle cyber-attack detection system 100, in accordance with aspects of the present disclosure, may also provide for the detection of one or more cyber-attacks using deep learning where natural language processing is employed to extract features (e.g., keywords and other attribute values) from the text log messages that preserve the semantics of the text log messages. The cyber-attack detection of the aspects of the present disclosure may be performed in substantially real-time, where real-time, as used herein, is defined as substantially concurrently as the vehicle 199 is in use, when the vehicle is between excursions, or at any other predetermined time period when the vehicle 199 is coupled to a communication network for transmitting at least the system log data 197 to the vehicle cyber-attack detection system 100.

The aspects of the present disclosure provide for a scalable multiple tiered vehicle cyber-attack detection system 100 that includes a multiple tier architecture that may identify and predict potential security risks for the onboard systems 198 by analyzing the system log data 197, for one or more vehicles, using one or more first cyber-attack anomaly detection module 113 (e.g., a behavior based anomaly detection agent) and one or more second cyber-attack anomaly detection module 117 (e.g., a supervised deep learning detection agent). The one or more first cyber-attack anomaly detection module 113 includes natural language processing based feature extraction and unsupervised behavior based anomaly detection using system entropy measurements 116. The input to the natural language processing is one or more batches of system log data 128 that is captured through a sliding time window 127. The output of the first cyber-attack anomaly detection module 113 is an indication of a first cyber-attack 114. The first cyber-attack anomaly detection module 113 requires no ground truth data.

The one or more second cyber-attack anomaly detection module 117 evaluates individual system log data 197 entries one at a time. The one or more second cyber-attack anomaly detection module 117 is combined with the natural language processing feature extraction for system log data analysis. The natural language processing parses the text log messages and extracts one or more sets of keywords or tokens as training data for a deep learning component 118 (e.g., a module/agent of the respective second cyber-attack anomaly detection module 117). Data tagging (e.g., good data indicative of no cyber-attack/bad data indicative of a cyber-attack), with respect to training of the deep learning component 118, is achieved by human subject matter experts. Once trained, the deep learning component 118 provides automated security analysis in substantially real-time, which is an advancement over conventional security management practices, which mainly rely on rule-based systems requiring manual decision making and prediction.

As used herein the terms "module" and "agent" refer to a self-contained unit which serves as a building block for the vehicle cyber-attack detection system 100. The self-contained unit is in one aspect a distinct and identifiable unit of a non-transitory computer program code configured to perform the functions described herein with respect to the respective modules. In another aspect, the self-contained unit is a selection of independent electronic circuits packaged onto a circuit board and being configured to provide the functions described herein with respect to the respective modules.

Illustrative, non-exhaustive examples, which may or may not be claimed, of the subject matter according to the present disclosure are provided below.

Referring to FIGS. 1 and 2, the vehicle cyber-attack detection system 100 includes a hierarchical arrangement of cyber-attack detection modules 200 and a cyber-attack alert module 130. The hierarchical arrangement of cyber-attack detection modules 200 includes at least one first tier security module 110 (also referred to herein as a first tier agent) and at least one second tier security module 150 (also referred to herein as a second tier agent).

The at least one first tier security module 110 consumes the system log data 197 as input and performs cyber security analytics on the fly upon acquiring the system log data 197 from the vehicle 199 or upon the earliest time when the system log data 197 becomes available. The output of the at least one first tier security module 110 is an indication of whether a cyber-attack has occurred. As noted herein, the system log data 197 may not include packet level details and as such conventional cybersecurity intrusion detection approaches may not provide adequate cyber-attack detection. In accordance with the aspects of the present disclosure the at least one first tier security module 110 are configured to recognize a free format text description of log events to extract security relevant events. As described herein, for exemplary purposes, the at least one first tier security module 110 is configured to identify an occurrence of a cyber-attack with behavior based anomaly detection, trainable deep learning anomaly detection and a knowledge-centric signature (that creates operational knowledge for the anomaly detection).

The at least one first tier security module 110 may include any suitable number of first tier security modules 110A-110n. In accordance with aspects of the present disclosure, the at least one first tier security module 110 comprises a respective first tier security module 110A-110n for each vehicle 199A-199F in at least one fleet of vehicles 200A-200n. The at least one first tier security module 110 is configured so as to be modular so that the at least one first tier security module 110 is added or removed from the vehicle cyber-attack detection system depending on an addition or removal of the respective vehicle in at least one fleet of vehicles. The at least one first tier security module 110 is coupled to at least one onboard system 198 of a respective vehicle 199 by coupling 180E and is configured so as to receive system log data 197 generated by the at least one onboard system 198 of the respective vehicle 197 over the coupling 180E. The coupling 180E may be any suitable wired or wireless communication coupling. In one aspect, the communication couplings are cloud based communication couplings (e.g., performed over the Internet). In one aspect, the coupling 180E uses TCP/IP protocols while in other aspects, any suitable communication protocols may be used. In other aspects, the at least one first tier security module 110 is disposed onboard the respective vehicle 199 while in other aspects, the at least one first tier security module is disposed off-board the respective vehicle 199.

Referring to FIGS. 1 and 3A, each of the at least one first tier security module 110 includes a natural language processing module 112 and is configured, e.g., through the natural language processing module 112, to extract extracted features 111 from the system log data 197 with natural language processing for one or more of behavior based cyber-attack detection and classification based cyber-attack detection. For example, the natural language processing module 112 includes a natural language pre-processing 300 and feature extraction 310 that extract the extracted features

111 from the system log data 197 for each of a first cyber-attack anomaly detection module 113 and a second cyber-attack anomaly detection module 117 of the at least one first tier security module 110.

Referring to FIGS. 1, 3A, 3B, and 4, to extract the extracted features 111, the first cyber-attack anomaly detection module 113 obtains the system log data 197 from the onboard system 198 in any suitable manner (FIG. 4, Block 410). For example, in one aspect, the at least one first tier security module 110 is configured to couple with the at least one onboard system 198 of the respective vehicle 199, to obtain the system log data 197, between excursions (e.g., flights, missions, etc.; and in the case of an aircraft between excursions includes after landing and prior to takeoff) of the vehicle 199. In other aspects, the at least one first tier security module 110 is configured to couple with the at least one onboard system 198 of the respective vehicle 199, to obtain the system log data 197, at predetermined time intervals (e.g., with the vehicle 199 in operation or sitting idle, and in the case of an aircraft during flight or between flights).

The first cyber-attack anomaly detection module 113 includes a windowing module 126 that is configured to generate, from the system log data 197 a time series 127A-127n (FIGS. 3A and 3B) of overlapping windowed system log data 126, where each time window 127 of the overlapping windowed system log data 126 includes a respective batch of system log data 128 (FIG. 4, Block 420). The size of each time window 127 may be any suitable predetermined size and the overlap between the time windows 127 may be any suitable overlap that is set in any suitable manner (FIG. 4, Block 415). The extracted features 111 are extracted from the respective batch of system log data 128 from at least one window 127 of the overlapping windowed system log data 126 (FIG. 4, Block 430) using behavior keywords (FIG. 4, Block 425), where the behavior keywords may be established in any suitable manner, such as by subject matter experts. For example, the natural language pre-processing 300 of the natural language processing module 112 firstly tokenizes the system log data 197 (e.g., the respective batch of system log data 128) by chopping up the text messages that form the respective batch of system log data 128 into individual terms. Stop words (such as, e.g., for, the, is, are, etc.) are removed and a normalization process 111NP that canonicalizes tokens by matching and merging terms with superficial differences in the character sequences of the tokens. For example, "USA" and "U.S.A." are treated as being equivalent, "cyber attack" and "cyber-attack" are treated as being equivalent, "words" and "word" are treated as being equivalent, "failed" and "fail" are treated as being equivalent, etc. It is noted that at least some of the system log data 197 is normalized (e.g., system log data, such as data that identifies a source of information, e.g., an IP address, MAC address, etc., may not be normalized). The feature extraction 310 is performed on the normalized and/or pre-processed respective batch of system log data 128. The feature extraction 310 generally includes a feature selection step and feature engineering step. The feature selection step selects set of keywords (or terms) through the natural language processing. As a non-limiting example, the first cyber-attack anomaly detection module 113, in order to detect a port scan attack would choose, e.g., terms such as "Server IP address", "Source Port", "Destination Port", etc. The feature engineering step evaluates and creates the extracted features 111 from the selected features, e.g., such as the "number of distinct server IP address", "a number of distinct Source Ports", etc., as illustrated in FIG. 3A. The extracted features 111 form or are otherwise arranged as feature vectors 111V1, 111V2 and are input into an entropy module 115 of the first cyber-attack anomaly detection module 113. Each respective batch of system log data 128 has a respective set of feature vectors 111S1-111Sn corresponding to a respective time window 127 in the time series 127A-127n of overlapping windowed system log data 126.

The first cyber-attack anomaly detection module 113 is also configured to identify a first cyber-attack 114 based on system entropy measurements 116 determined by the first cyber-attack anomaly detection module 113 from the extracted features 111. It is noted that noticeable changes in entropy values can indicate the changes in system behavior pattern due to, for example, interrupted/disabled services or cyber-attacks. Each time window 127 in the time series 127A-127n overlaps with the previous window 127 in the time series 127A-127n to monitor a trend from which anomaly evaluation is performed. As an example, the entropy module 115 is configured to determine the system entropy measurements from the extracted features 111 extracted from the respective batch of system log data 128 from the at least one window 127 of the overlapping windowed system log data 126 (FIG. 4, Block 440). The entropy module 115 is configured to determine any suitable system entropy measurements 116, such as a Shannon entropy of the system log data 197. A system entropy measurement 116A-116n may be determined for each set of feature vectors 111S1-111Sn to form an entropy time series 116TS. The first cyber-attack anomaly detection module 113 determines a statistically meaningful value (e.g., mean, standard deviation, etc.) 320 from the entropy time series 116TS and compares the statistically meaningful value 320 to a predetermined threshold 330 for determining whether an anomaly exists (e.g., anomaly detection 340) (FIG. 4, Block 450). The detection of the anomaly is indicative of the first cyber-attack 114. The predetermined threshold 330 may be any suitable threshold such as for example, a statistically meaningful value of the system entropy. For example, the threshold 330 for the first cyber-attack anomaly detection module 113 to declare an anomaly detection 340 may be the mean value for the entropy time series 116TS plus the standard deviation of the entropy times series 116TS times a predetermined parameter (e.g., threshold=mean+(standard deviation*predetermined parameter)) where the predetermined parameter is an integer such as 1, 2, 3, etc.

An exemplary entropy based anomaly detection algorithm is as follows (referring to FIG. 3B):

For a predetermined window size, a predetermined window overlap size, and a number of data windows N,
For i=1, 2, 3, . . . , N (e.g., a positive integer):
take system log data X(i) (e.g., the respective batch of system log data 128) from the $i^{th}$ data window (again, where i=1, 2, 3, . . . , N);
extract keywords from the system log data X(i) (e.g., the respective batch of system log data 128) using natural language processing;
create a feature vector f(i) (e.g., feature vectors 111V1-111Vn) from the keywords extracted from the system log data X(i) (e.g., to form feature vectors 111S1-111Sn);
calculate a system entropy E(i) (e.g., the respective entropy measurement 116A-116n) based on the feature vector f(i);
slide to the next data window (i=i+1)
End;
Create an entropy time series E={E(1), E(2), . . . , E(N)};
Calculate a Mean M and a standard deviation S of the entropy time series E;
Determine an entropy threshold T=f(M, S).

An exemplary on-line/real-time implementation of the entropy based anomaly detection algorithm is as follows:

For the predetermined window size, the predetermined window overlap size, and the entropy threshold T, for at least one (or each) time window 127
Capture on-line/real-time windowed system log data batch (e.g., the respective batch of system log data 128) (FIG. 4, Block 410);
Extract keywords from the captured windowed batch of system log data 128 using natural language processing (FIG. 4, Blocks 420 and 430);
Create a feature vector(s) "X" 111V1-111Vn from the keywords extracted from the captured windowed batch of system log data 128 (FIG. 4, Blocks 420 and 430);
Calculate a system entropy E(X) based on the feature vector(s) "X" 111V1-111Vn (FIG. 4, Block 440);
If the system entropy E(X) is greater than the entropy threshold T, declare an anomaly (FIG. 4, Block 450);
Rest for next on-line/real-time windowed log data batch.

Referring to FIGS. 1, 5A, and 5B, the second cyber-attack anomaly detection module 117 includes the deep learning component 118 and is configured to identify a second cyber-attack 119 based on, for example, classification of the extracted features 111. In one aspect, the first cyber-attack 114 and the second cyber-attack 119 comprise a same type of cyber-attack. In one aspect, the first cyber-attack 114 comprises a first type of cyber-attack 114A and the second cyber-attack 119 comprises a second type of cyber-attack 119A that is different than the first type of cyber-attack 114A. In one aspect, one or more of the first cyber-attack 114 and the second cyber-attack 119 include, but are not limited to, one or more of zero-day attacks, denial of service, sophisticated/advanced persistent malware, structured query language (SQL) injection attacks, session hijacking and man-in-the-middle attacks, network probing, brute-force cracking, ransomware, and insider threats. The extracted features 111 may include a first group 111A of extracted features 111 for the first cyber-attack anomaly detection module 113 and a second group 111B of extracted features 111 for the second cyber-attack anomaly detection module 117. In one aspect, the first group 111A of extracted features 111 is different than the second group 111B of extracted features 111. For example, the second group 111B of extracted features 111 for the second cyber-attack anomaly detection module 117 may use substantially all of the keywords and their attribute values obtained from natural language processing of the system log data as the extracted features 111 (e.g., the keyword "server IP address" may have more than about 100 distinct IP address attribute values in the system log data 197, the keywords "source port" and "destination port" may have over about 200 attribute values in the system log data 197, etc.) compared to smaller number of feature vectors 111V (e.g., extracted features) used by the first cyber-attack anomaly detection module 113.

The deep learning component 118 of the second cyber-attack anomaly detection module 117 includes any suitable artificial neural network (ANN) 121. In one aspect, the artificial neural network 121 comprises a convolutional neural network although in other aspects any other suitable type of artificial neural network or deep learning, such as with multiple hidden layers, may be used. The deep learning component 118 may be trained in any suitable manner. For example, referring to the method for training second cyber-attack anomaly detection module 500A, the deep learning component 118 may be trained from received historical system log data 502 (FIG. 5A) and pre-defined behavior keywords 505 (FIG. 5A). The received historical system log data 502 may be system log data obtained from any number of vehicles 199 (e.g., having the same or similar types of onboard systems 198) that is gathered over any suitable historic time period. The pre-defined behavior keywords 505 maybe generated in any suitable manner such as from subject matter experts. Natural language processing (Block 510, FIG. 5A) is performed on the historical system log data 502 based on the behavior keywords 505 to train the deep learning component 118 (Block 515, FIG. 5) for recognizing when a cyber-attack anomaly exists in the system log data 197. As an example, the deep learning component 118 may be trained to identify cyber-attack anomalies through a classification 120 of the extracted features 111. In one aspect, the classification of the extracted features 111 is a binary classification of the extracted features 111 that predicts whether an individual log item of the system log data 197 is indicative of the second cyber-attack 119. In other aspects, the classification of the extracted features 111 may be any suitable classification that provides for the prediction of whether an individual log item of the system log data 197 is indicative of the second cyber-attack 119. In operation, referring to the method for determining a second cyber-attack 500B, system log data 197 is received by the first tier security module 110 (Block 520, FIG. 5B) and is processed through the natural language processing module 112 (Block 525, FIG. 5B) based on the behavior keywords 505 to generate the extracted features 111. The deep learning component 118 of the second cyber-attack anomaly detection module 117 performs an anomaly detection (Block 530, FIG. 5B), such as by classifying the extracted features 111, to determine if an indication of the second cyber-attack 119 is present in the system log data 197.

Referring to FIGS. 1, 2, 6, and 7, at least one second tier security module 150 is coupled to the at least one first tier security module 110 and at least one vehicle operator database 140 in any suitable manner. For example, the second tier security module 150 may be coupled to the at least one first tier security module 110 through coupling 180A and to the at least one vehicle operator database through coupling 180C. Each of the couplings 180A, 180C may be substantially similar to coupling 180E described above. The at least one second tier security module 150 is configured to correlate a cyber-attack (e.g., one or more of the first cyber-attack 114 and the second cyber-attack 119) identified by the at least one first tier security module 110 with vehicle operational data 141 (and in the case of an aircraft, airline operational data 142) to identify at least one cyber-attack trend 152. As an example, the at least one cyber-attack trend 152 includes, but is not limited to, one or more cyber-attack(s) directed to a particular vehicle (e.g., in the case of aircraft airline) operator, a particular model vehicle, and/or a particular airport.

FIG. 6 illustrates an example of a second tier security module 150 that is common to the first tier security modules 110A-110C of vehicles 199A-199C of the fleet of vehicles 200A. FIG. 2 illustrates a broader utilization of multiple second tier security modules 150A-150n that are coupled to the first tier security modules 110A-110n of vehicles 199A-199n of multiple fleets of vehicles 200A-200n so as to determine different cyber-attack tends 152. For example, the second tier security module 150 illustrated in FIG. 6 is akin to the second tier security modules 150B, 150E illustrated in FIG. 2. These second tier security modules 150, 150B, 150E are coupled to the vehicles 199A-C, 199D-F of a respective fleet of vehicles 200A, 200B for determining at least occurrences of cyber-attacks directed towards the respective fleet of vehicles 200A, 200B (e.g., attacks directed to a particular vehicle operator where each vehicle operator operates a respective fleet of vehicles 200A, 200B; or attacks directed to a particular fleet of vehicles 200A, 20B where a single vehicle operator operates more than one fleet of vehicles). In other examples, the fleet of vehicles 200A may have multiple different second tier security modules 150B, 150B1 associated therewith. Similarly, fleet of vehicles 200B may have multiple different second tier security modules 150E, 150E1, 150E2 associated therewith. Each of the different second tier security modules 150B, 150B1 for the fleet of vehicles 200A and the different second tier security modules 150E, 150E1, 150E2 for the fleet of vehicles 200B may be configured to detect different trends. For example, second tier security module 150B, 150E may be configured to detect cyber-attack trends 152 directed towards the respective fleet of vehicles 200A, 200B. The second tier security module 150B1, 150E1, 150E2 may be configured to detect cyber-attack trends 152 directed towards a particular vehicle type/model within the respective fleet of vehicles 200A, 200B.

The second tier security modules 150A, 150F may be coupled to the first tier security module 110A-110n for each vehicle 199A-199n of the fleets of vehicles 200A-200n that land at a particular airport A-n. These second tier security modules 150A, 150F may be configured to so as to determine different cyber-attack trends 152 directed to the respective airport A-n. The second tier security module 150C may be coupled to the first tier security modules 110A-110n for a first type/model vehicle (e.g., across the multiple fleets of vehicles 200A-200n) while the second tier security module 150D may be coupled to the first tier security modules 110A-110n for a second type/model vehicle (e.g., across the multiple fleets of vehicles 200A-200n). The second tier security modules 150C, 150D may be configured to identify cyber-attack trends 152 directed towards the respective types/model of vehicles regardless of which fleet of vehicles 200A-200n the respective types/model of vehicles belong. Various other combinations of couplings between the second tier security modules 150A-150n and the first tier security modules 110A-110n are possible in accordance with aspects of the present disclosure to identify any suitable cyber-attack trends 152 for a particular type/model vehicle, a particular number/fleet of vehicles, a particular vehicle base or depot (e.g., such as an airport in the case of aircraft), a particular vehicle manufacturer, etc.

Referring to FIGS. 1 and 7, an exemplary second tier security module 150 is illustrated. The second tier security module 150, used alone or in conjunction with other second tier security modules 150A-150n (FIG. 2), receive the cyber-attack determinations from respective first tier security modules 110 (FIG. 1), 100A-100n (FIG. 2) to build a security event landscape for enhanced situational awareness to provide for a better understanding of whether cyber-attack incidents are targeting individual vehicle operators, a particular vehicle type/model, and/or a particular base or depot at which the vehicles arrive and depart (e.g., such as an airport in the case of aircraft). The second tier security module 150 is event driven so as to enhance vehicle operation situational awareness and security monitoring and assists users (such as vehicle operators, manufacturers, airport personnel, etc.) in creating actionable intelligence and control for vehicle operations.

The second tier security module 150 includes an input module 700, a correlation module 151 and a report generation and dissemination module 740. The input module 700 is configured to receive one or more notifications of the first cyber-attack 114 and the second cyber-attack 119 from the first tier security module 110, such as through coupling 180A. In one aspect, the at least one second tier security module 150 is coupled to the at least one first tier security module 110 so that data transfer from the at least one first tier security module 110 to the at least one second tier security module 150 is an asynchronous communication. The asynchronous communication includes storing messages (e.g., regarding the occurrence of the first cyber-attack 114 and/or the second cyber-attack 119) from the at least one first tier security module 110 in a queue 170 for consumption by the at least one second tier security module 150. The asynchronous messaging between the at least one first tier security module 110 and the at least one second tier security module 150 provides for a loose coupling and smooth data flow as at least one first tier security modules 110 can process system log data 197 regardless of a reply from the at least one second tier security module 150 (this provides for the at least one first tier security module 110 and the at least one second tier security module 150 being online, e.g., accessing the communication network to which the coupling 180A belongs, at the same time or at different times). The asynchronous messaging between the at least one first tier security module 110 and the at least one second tier security module 150 may also provide for the integration of outputs (e.g., the indication of a cyber-attack) from the at least one first tier security module 110, by the at least one second tier security module 150, arriving from different queues 170 regardless of output loads from the at least one first tier security module 110. The asynchronous messaging between the at least one first tier security module 110 and the at least one second tier security module 150 may further provide for downstream load balancing for users of the vehicle cyber-attack detection system 100 depending on the processing capability of the users.

The correlation module 151 may include any suitable machine learning, statistical or correlation processing that is configured to correlate the occurrences of the first cyber-attack 114 and the second cyber-attack 119 with the vehicle operational data 141 from the vehicle operator databases 140 to identify at least one cyber-attack trend 152. For example, the correlation module 151 may include a match detection module 710 and an alert determination module 730 that are trained in any suitable manner with any suitable training data 790 that configures the match detection module 710 to determine cyber-attack matches for a particular vehicle, between types of vehicles, airports, manufactures, fleets, etc.; and/or configured the alert determination module 730 to determine whether to issue an alert of a cyber-attack event for the particular vehicle, between types of vehicles, airports, manufactures, fleets, etc. The vehicle operational data 141 is input into the match detection module 710 and a state of the particular vehicle, the types of vehicles, airports, manufactures, fleets, etc. are updated by a state update module 720 based on the match determinations (e.g., trends) made by the match detection module 710 and the vehicle operational data 141. The alert determination module determines, in any suitable manner, whether a cyber-attack alert should be used based on the updated state of the particular vehicle, the types of vehicles, airports, manufacturers, fleets, etc. and the vehicle operational data 141. The report generation and dissemination module 740 reports the cyber-attack trend 152 identified by the correlation module 151 to for example, a cyber-attack alert module 130.

Referring to FIGS. 1 and 2, the cyber-attack alert module 130 is coupled to one or more of the at least one first tier security module 110 and the at least one second tier security module 150 in any suitable manner, such as with couplings

180B, 180D. The couplings 180B, 180D may be substantially similar to coupling 180E described above. There may be a cyber-attack alert module 130 for each user of the vehicle cyber-attack detection system 100. For example, referring to FIG. 2, one user of the vehicle cyber-attack detection system 100 may be a vehicle manufacturer that operates an omnibus operations center 299 which monitors the vehicles/fleets of the manufacturer and the airports at which the vehicles/fleets operate. As another example, users of the vehicle cyber-attack detection system 100 may include one or more fleet operations centers 200AFO-200nFO, each of which may correspond to an operator of the respective fleets 200A-200n. In other aspects, users of the vehicle cyber-attack detection system 100 may include airports which may operate an airport operations center (not shown) or any other suitable user. Each of the omnibus operations center 299 and the one or more fleet operations centers 200AFO-200nFO include a respective cyber-attack alert module 130. Each of the cyber-attack alert modules 130 includes a user interface 131 and a notification generation module 135. The notification generation module 135 of the cyber-attack alert module 130 is configured to generate a notification of one or more of the cyber-attack (e.g., the first cyber-attack 114 and/or the second cyber-attack 119) identified by the at least one first tier security module 110 and the at least one cyber-attack trend 152 identified by the at least one second tier security module 150 on the user interface 131 to effect cyber-attack diagnostics and remediation by vehicle personnel 190 (e.g., personnel of the vehicle manufacturer, personnel of the vehicle operator, personnel of the airport, etc.). For example, the notification generation module 135 is configured to generate a first notification 132 indicating the occurrence of one or more of the first cyber-attack 114 and the second cyber-attack 119 identified by the at least one first tier security module 110. The notification generation module 135 is configured to generate a second notification 133 indicating the cyber-attack trend 152 identified by the at least one second tier security module 150.

Referring to FIGS. 1 and 8, an exemplary operation of the vehicle cyber-attack detection system 100 will be described with respect to the method for vehicle cyber-attack detection 800. System log data 197 generated by the at least one onboard system 198 of the respective vehicle 199 is received (Block 810, FIG. 8) with the at least one first tier security module 110 coupled to the at least one onboard system 198 of the respective vehicle 199. Extracted features 111 are extracted, with the at least one first tier security module, from the system log data 197 with natural language processing (Block 820, FIG. 8). A first cyber-attack 114 is identified, with a first cyber-attack anomaly detection module 113 of the at least one first tier security module 110, based on system entropy measurements 116 (Block 830, FIG. 8) determined by the first cyber-attack anomaly detection module 113 from the extracted features 111. A second cyber-attack 119 is identified, with the second cyber-attack anomaly detection module 117 of the at least one first tier security module 110 that includes a deep learning component 118, based on classification 120 of the extracted features 111 (Block 840, FIG. 8). Blocks 830 and 840 in FIG. 8 may occur in parallel or serially. A notification (e.g., a first notification 132) of one or more of the first cyber-attack 114 and the second cyber-attack 119 is generated (Block 850, FIG. 8) on a user interface 131 of the cyber-attack alert module 130 that is coupled to the at least one first tier security module 110 to effect cyber-attack diagnostics and remediation by vehicle personnel 190. One or more of the first cyber-attack 114 and the second cyber-attack 119 is correlated, with at least one second tier security module 150 coupled to the at least one first tier security module 110, the cyber-attack alert module 130, and at least the vehicle operator database 140, with vehicle operational data 141 to identify at least one cyber-attack trend 152 (Block 860, FIG. 8). Another notification (e.g., the second notification 133) of the at least one cyber-attack trend 132 is generated, with the cyber-attack alert module 130, on the user interface 131 to effect the cyber-attack diagnostics and remediation by the vehicle personnel 190 (Block 870, FIG. 8).

As can be seen above, the vehicle cyber-attack detection system 100 utilizes behavioral attributes of system log data 197 that are generated by natural language processing based feature engineering that transforms raw text log messages of the system log data 197 into a set of feature vectors 111V for consumption by the first cyber-attack anomaly detection module 113. The vehicle cyber-attack detection system 100 also utilizes deep learning of the second cyber—attack anomaly detection module 117, that has an its input natural language processed vehicle security logs 197 from which a normalized/tokenized array of keywords and values are extracted which preserve the semantic contents of the vehicle security logs 197. Once trained, the deep learning component 118 of the second cyber-attack anomaly detection module 117 evaluates individual log data of the system log data 197 for substantially real-time and online cyber-attack security analysis. The tiered architecture of the cyber-attack detection system 100 provides for a scalable system for which first tier security modules 110 and second tier security modules 150 can be added or removed depending on a number of vehicles being monitored (e.g., vertical scalability) and a category (e.g., manufacturer, operators, types/models of vehicles, etc.) of cyber-attack for which cyber-attack trends 152 are to be determined (e.g., horizontal scalability). The aspects of the present disclosure may improve fleet wide and, in the case of aircraft, airline wide cyber-attack security monitoring and integration with downstream systems (e.g., operations centers, etc.).

Referring to FIGS. 9 and 10, examples of the present disclosure may be described in the context of aircraft manufacturing and service method 1000 as shown in FIG. 10. In other aspects, the examples of the present disclosure may be applied in any suitable industry, such as e.g., automotive, maritime, aerospace, etc. as noted above. With respect to aircraft manufacturing, during pre-production, illustrative method 1000 may include specification and design (block 1010) of aircraft 199A and material procurement (block 1020). During production, component and subassembly manufacturing (block 1030) and system integration (block 1040) of aircraft 199A may take place. Thereafter, aircraft 199A may go through certification and delivery (block 1050) to be placed in service (block 1060). While in service, aircraft 199A may be scheduled for routine maintenance and service (block 1070). Routine maintenance and service may include modification, reconfiguration, refurbishment, etc. of one or more systems of aircraft 199A which may include and/or be facilitated by the fault determination described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

The apparatus(es), system(s), and method(s) shown or described herein may be employed during any one or more of the stages of the manufacturing and service method 1000. For example, components or subassemblies corresponding to component and subassembly manufacturing (block 1030) may be fabricated or manufactured in a manner similar to components or subassemblies produced while aircraft 199A is in service (block 1060). Similarly, one or more examples of the apparatus or method realizations, or a combination thereof, may be utilized, for example and without limitation, while aircraft 199A is in service (block 1060) and/or during maintenance and service (block 1070).

The following are provided in accordance with the aspects of the present disclosure:

A1. A vehicle cyber-attack detection system comprising:
at least one first tier security module being coupled to at least one onboard system of a respective vehicle and being configured so as to receive system log data generated by the at least one onboard system of the respective vehicle, the at least one first tier security module being configured to extract extracted features from the system log data with natural language processing and including
a first cyber-attack anomaly detection module configured to identify a first cyber-attack based on system entropy measurements determined by the first cyber-attack anomaly detection module from the extracted features, and
a second cyber-attack anomaly detection module that includes a deep learning component configured to identify a second cyber-attack based on classification of the extracted features;
and
a cyber-attack alert module being coupled to the at least one first tier security module and including a user interface, the cyber-attack alert module being configured to generate a notification of one or more of the first cyber-attack and the second cyber-attack on the user interface to effect cyber-attack diagnostics and remediation by vehicle personnel.

A2. The vehicle cyber-attack detection system of paragraph A1, wherein the extracted features include a first group of extracted features for the first cyber-attack anomaly detection module and a second group of extracted features for the second cyber-attack anomaly detection module, where the first group of extracted features is different than the second group of extracted features.

A3. The vehicle cyber-attack detection system of paragraph A1, further comprising:
at least one second tier security module coupled to the at least one first tier security module and the cyber-attack alert module, the at least one second tier security module being coupled to at least a vehicle operator database and being configured to correlate one or more of the first cyber-attack and the second cyber-attack with vehicle operational data to identify at least one cyber-attack trend; and
the cyber-attack alert module being configured to generate another notification of the at least one cyber-attack trend on the user interface to effect the cyber-attack diagnostics and remediation by the vehicle personnel.

A4. The vehicle cyber-attack detection system of paragraph A3, wherein the vehicle operational data is airline operational data.

A5. The vehicle cyber-attack detection system of paragraph A3, wherein the at least one second tier security module is coupled to one or more of the at least one first tier security module and the cyber-attack alert module through a wireless communication coupling.

A6. The vehicle cyber-attack detection system of paragraph A5, wherein the wireless communication coupling is a cloud based communication coupling.

A7. The vehicle cyber-attack detection system of paragraph A3, wherein the at least one second tier security module is coupled to one or more of the at least one first tier security module and the cyber-attack alert module through a wired communication coupling.

A8. The vehicle cyber-attack detection system of paragraph A3, wherein the at least one second tier security module is coupled to the at least one first tier security module so that data transfer from the at least one first tier security module to the at least one second tier security module is an asynchronous communication.

A9. The vehicle cyber-attack detection system of paragraph A8, wherein the asynchronous communication comprises storing messages from the at least one first tier security module in a queue for consumption by the at least one second tier security module.

A10. The vehicle cyber-attack detection system of paragraph A1, wherein the first cyber-attack and the second cyber-attack comprise a same type of cyber-attack.

A11. The vehicle cyber-attack detection system of paragraph A1, wherein the first cyber-attack comprises a first type of cyber-attack and the second cyber-attack comprises a second type of cyber-attack that is different than the first type of cyber-attack.

A12. The vehicle cyber-attack detection system of paragraph A1, wherein one or more of the first cyber-attack and the second cyber-attack comprises one or more of zero-day attacks, denial of service, sophisticated/advanced persistent malware, structured query language (SQL) injection attacks, session hijacking and man-in-the-middle attacks, network probing, brute-force cracking, ransomware, and insider threats.

A13. The vehicle cyber-attack detection system of paragraph A1, wherein the at least one first tier security module comprises a respective first tier security module for each vehicle in at least one fleet of vehicles.

A14. The vehicle cyber-attack detection system of paragraph A1, wherein the at least one first tier security module is configured so as to be added or removed from the vehicle cyber-attack detection system depending on an addition or removal of the respective vehicle in at least one fleet of vehicles.

A15. The vehicle cyber-attack detection system of paragraph A1, wherein the deep learning component of the second cyber-attack anomaly detection module comprises an artificial neural network.

A16. The vehicle cyber-attack detection system of paragraph A15, wherein the artificial neural network comprises a convolutional neural network.

A17. The vehicle cyber-attack detection system of paragraph A1, wherein the first cyber-attack anomaly detection module is configured to:
generate, from the system log data a time series of overlapping windowed system log data, where each window of the overlapping windowed system log data includes a respective batch of system log data;
extract the extracted features from the respective batch of system log data from at least one window of the overlapping windowed system log data; and
determine the system entropy measurements from the extracted features extracted from the respective batch of system log data from the at least one window of the overlapping windowed system log data.

A18. The vehicle cyber-attack detection system of paragraph A1, wherein the extracted features comprise a normalization of at least some of the system log data.

A19. The vehicle cyber-attack detection system of paragraph A1, wherein the classification of the extracted features is a binary classification of the extracted features that predicts whether an individual log item of the system log data is indicative of the second cyber-attack.

A20. The vehicle cyber-attack detection system of paragraph A1, wherein the at least one first tier security module is configured to couple with the at least one onboard system of the respective vehicle between excursions of the vehicle.

A21. The vehicle cyber-attack detection system of paragraph A1, wherein the at least one first tier security module is configured to couple with the at least one onboard system of the respective vehicle at predetermined time intervals.

A22. The vehicle cyber-attack detection system of paragraph A1, wherein the at least one first tier security module is coupled to the at least one onboard system of the respective vehicle through a wireless communication coupling.

A23. The vehicle cyber-attack detection system of paragraph A22, wherein the wireless communication coupling is a cloud based communication coupling.

A24. The vehicle cyber-attack detection system of paragraph A1, wherein the at least one first tier security module is coupled to the at least one onboard system of the respective vehicle through a wired communication coupling.

A25. The vehicle cyber-attack detection system of paragraph A1, wherein the cyber-attack alert module is coupled to the at least one first tier security module through a wireless communication coupling.

A26. The vehicle cyber-attack detection system of paragraph A25, wherein the wireless communication coupling is a cloud based communication coupling.

A27. The vehicle cyber-attack detection system of paragraph A1, wherein the cyber-attack alert module is coupled to the at least one first tier security module through a wired communication coupling.

A28. The vehicle cyber-attack detection system of paragraph A1, wherein the at least one first tier security module is disposed onboard the respective vehicle.

B1. A vehicle cyber-attack detection system comprising:
a hierarchical arrangement of cyber-attack detection modules, the hierarchical arrangement of cyber-attack detection modules includes
at least one first tier security module coupled to at least one onboard system of a respective vehicle and being configured so as to receive system log data generated by the at least one onboard system of the respective vehicle, the at least one first tier security module being configured to extract extracted features from the system log data with natural language processing for one or more of behavior based cyber-attack detection and classification based cyber-attack detection, and
at least one second tier security module coupled to the at least one first tier security module and at least a vehicle operator database, the at least one second tier security module being configured to correlate a cyber-attack identified by the at least one first tier security module with vehicle operational data to identify at least one cyber-attack trend; and
a cyber-attack alert module being coupled to one or more of the at least one first tier security module and the at least one second tier security module, the cyber-attack alert module including a user interface and being configured to generate one or more of a notification of one of the cyber-attack identified by the at least one first tier security module and the at least one cyber-attack trend identified by the at least one second tier security module on the user interface to effect cyber-attack diagnostics and remediation by vehicle personnel.

B2. The vehicle cyber-attack detection system of paragraph B1, wherein the vehicle operational data is airline operational data.

B3. The vehicle cyber-attack detection system of paragraph B1, wherein the at least one first tier security module is configured to extract extracted features from the system log data with natural language processing and includes
a first cyber-attack anomaly detection module configured to identify a first cyber-attack based on system entropy measurements determined by the first cyber-attack anomaly detection module from the extracted features, and
a second cyber-attack anomaly detection module that includes a deep learning component configured to identify a second cyber-attack based on classification of the extracted features.

B4. The vehicle cyber-attack detection system of paragraph B3, wherein the first cyber-attack and the second cyber-attack comprise a same type of cyber-attack.

B5. The vehicle cyber-attack detection system of paragraph B3, wherein the first cyber-attack comprises a first type of cyber-attack and the second cyber-attack comprises a second type of cyber-attack that is different than the first type of cyber-attack.

B6. The vehicle cyber-attack detection system of paragraph B3, wherein one or more of the first cyber-attack and the second cyber-attack comprises one or more of zero-day attacks, denial of service, sophisticated/advanced persistent malware, structured query language (SQL) injection attacks, session hijacking and man-in-the-middle attacks, network probing, brute-force cracking, ransomware, and insider threats.

B7. The vehicle cyber-attack detection system of paragraph B3, wherein the deep learning component of the second cyber-attack anomaly detection module comprises an artificial neural network.

B8. The vehicle cyber-attack detection system of paragraph B7, wherein the artificial neural network comprises a convolutional neural network.

B9. The vehicle cyber-attack detection system of paragraph B3, wherein the first cyber-attack anomaly detection module is configured to:
generate, from the system log data a time series of overlapping windowed system log data, where each window of the overlapping windowed system log data includes a respective batch of system log data;
extract the extracted features from the respective batch of system log data from at least one window of the overlapping windowed system log data; and
determine the system entropy measurements from the extracted features extracted from the respective batch of system log data from the at least one window of the overlapping windowed system log data.

B10. The vehicle cyber-attack detection system of paragraph B1, wherein the at least one second tier security module is coupled to one or more of the at least one first tier security module and the cyber-attack alert module through a wireless communication coupling.

B11. The vehicle cyber-attack detection system of paragraph B10, wherein the wireless communication coupling is a cloud based communication coupling.

B12. The vehicle cyber-attack detection system of paragraph B1, wherein the at least one second tier security module is coupled to one or more of the at least one first tier security module and the cyber-attack alert module through a wired communication coupling.

B13. The vehicle cyber-attack detection system of paragraph B1, wherein the at least one second tier security module is coupled to the at least one first tier security module so that data transfer from the at least one first tier security module to the at least one second tier security module is an asynchronous communication.

B14. The vehicle cyber-attack detection system of paragraph B13, wherein the asynchronous communication comprises storing messages from the at least one first tier security module in a queue for consumption by the at least one second tier security module.

B15. The vehicle cyber-attack detection system of paragraph B1, wherein the at least one first tier security module comprises a respective first tier security module for each vehicle in at least one fleet of vehicles.

B16. The vehicle cyber-attack detection system of paragraph B1, wherein the at least one first tier security module is configured so as to be added or removed from the vehicle cyber-attack detection system depending on an addition or removal of the respective vehicle in at least one fleet of vehicles.

B17. The vehicle cyber-attack detection system of paragraph B1, wherein the extracted features comprise a normalization of at least some of the system log data.

B18. The vehicle cyber-attack detection system of paragraph B1, wherein the classification based cyber-attack detection is a binary classification of the extracted features that predicts whether an individual log item of the system log data is indicative of the second cyber-attack.

B19. The vehicle cyber-attack detection system of paragraph B1, wherein the at least one first tier security module is configured to couple with the at least one onboard system of the respective vehicle between excursions of the respective vehicle.

B20. The vehicle cyber-attack detection system of paragraph B1, wherein the at least one first tier security module is configured to couple with the at least one onboard system of the respective vehicle at predetermined time intervals.

B21. The vehicle cyber-attack detection system of paragraph B1, wherein the at least one first tier security module is coupled to the at least one onboard system of the respective vehicle through a wireless communication coupling.

B22. The vehicle cyber-attack detection system of paragraph B21, wherein the wireless communication coupling is a cloud based communication coupling.

B23. The vehicle cyber-attack detection system of paragraph B1, wherein the at least one first tier security module is coupled to the at least one onboard system of the respective vehicle through a wired communication coupling.

B24. The vehicle cyber-attack detection system of paragraph B1, wherein the cyber-attack alert module is coupled to the at least one first tier security module through a wireless communication coupling.

B25. The vehicle cyber-attack detection system of paragraph B24, wherein the wireless communication coupling is a cloud based communication coupling.

B26. The vehicle cyber-attack detection system of paragraph B1, wherein the cyber-attack alert module is coupled to the at least one first tier security module through a wired communication coupling.

B27. The vehicle cyber-attack detection system of paragraph B1, wherein the at least one first tier security module is disposed onboard the respective vehicle.

C1. A method for vehicle cyber-attack detection using a vehicle cyber-attack detection system, the method comprising:
receiving, with at least one first tier security module coupled to at least one onboard system of a respective vehicle, system log data generated by the at least one onboard system of the respective vehicle;
extracting, with the at least one first tier security module, extracted features from the system log data with natural language processing;
identifying a first cyber-attack, with a first cyber-attack anomaly detection module of the at least one first tier security module, based on system entropy measurements determined by the first cyber-attack anomaly detection module from the extracted features;
identifying a second cyber-attack, with a second cyber-attack anomaly detection module of the at least one first tier security module that includes a deep learning component, based on classification of the extracted features; and
generating a notification of one or more of the first cyber-attack and the second cyber-attack on a user interface of a cyber-attack alert module that is coupled to the at least one first tier security module to effect cyber-attack diagnostics and remediation by vehicle personnel.

C2. The method of paragraph C1, further comprising:
correlating, with at least one second tier security module coupled to the at least one first tier security module, the cyber-attack alert module, and at least a vehicle operator database, one or more of the first cyber-attack and the second cyber-attack with vehicle operational data to identify at least one cyber-attack trend; and
generating, with the cyber-attack alert module, another notification of the at least one cyber-attack trend on the user interface to effect the cyber-attack diagnostics and remediation by the vehicle personnel.

C3. The method of paragraph C2, wherein the vehicle operational data is airline operational data.

C4. The method of paragraph C2, wherein the at least one second tier security module communicates with one or more of the at least one first tier security module and the cyber-attack alert module through a wireless communication coupling.

C5. The method of paragraph C4, wherein the wireless communication coupling is a cloud based communication coupling.

C6. The method of paragraph C2, wherein the at least one second tier security module communicates with one or more of the at least one first tier security module and the cyber-attack alert module through a wired communication coupling.

C7. The method of paragraph C2, wherein data transfer from the at least one first tier security module to the at least one second tier security module is an asynchronous communication.

C8. The method of paragraph C7, wherein the asynchronous communication comprises storing messages from the at least one first tier security module in a queue for consumption by the at least one second tier security module.

C9. The method of paragraph C1, wherein the first cyber-attack and the second cyber-attack comprise a same type of cyber-attack.

C10. The method of paragraph C 1, wherein the first cyber-attack comprises a first type of cyber-attack and the second cyber-attack comprises a second type of cyber-attack that is different than the first type of cyber-attack.

C11. The method of paragraph C1, wherein one or more of the first cyber-attack and the second cyber-attack comprises one or more of zero-day attacks, denial of service, sophisticated/advanced persistent malware, structured query language (SQL) injection attacks, session hijacking and man-in-the-middle attacks, network probing, brute-force cracking, ransomware, and insider threats.

C12. The method of paragraph C1, wherein the at least one first tier security module is added or removed from the vehicle cyber-attack detection system depending on an addition or removal of the respective vehicle in at least one fleet of vehicles.

C13. The method of paragraph C1, wherein the deep learning component of the second cyber-attack anomaly detection module comprises an artificial neural network.

C14. The method of paragraph C13, wherein the artificial neural network comprises a convolutional neural network.

C15. The method of paragraph C1, further comprising, with the first cyber-attack anomaly detection module:

generating, from the system log data a time series of overlapping windowed system log data, where each window of the overlapping windowed system log data includes a respective batch of system log data;

extracting the extracted features from the respective batch of system log data from at least one window of the overlapping windowed system log data; and determining the system entropy measurements from the extracted features extracted from the respective batch of system log data from the at least one window of the overlapping windowed system log data.

C16. The method of paragraph C1, wherein the extracted features comprise a normalization of at least some of the system log data.

C17. The method of paragraph C1, wherein the classification of the extracted features is a binary classification of the extracted features that predicts whether an individual log item of the system log data is indicative of the second cyber-attack.

C18. The method of paragraph C1, wherein the at least one first tier security module communicates with the at least one onboard system of the respective vehicle between excursions of the vehicle.

C19. The method of paragraph C1, wherein the at least one first tier security module communicates with the at least one onboard system of the respective vehicle at predetermined time intervals.

C20. The method of paragraph C1, wherein the at least one first tier security module communicates with the at least one onboard system of the respective vehicle through a wireless communication coupling.

C21. The method of paragraph C20, wherein the wireless communication coupling is a cloud based communication coupling.

C22. The method of paragraph C1, wherein the at least one first tier security module communicates with the at least one onboard system of the respective vehicle through a wired communication coupling.

C23. The method of paragraph C1, wherein the cyber-attack alert module communicates with the at least one first tier security module through a wireless communication coupling.

C24. The method of paragraph C23, wherein the wireless communication coupling is a cloud based communication coupling.

C25. The method of paragraph C1, wherein the cyber-attack alert module communicates with the at least one first tier security module through a wired communication coupling.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 4, 5A, 5B, 8, and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 4, 5A, 5B, 8, and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A multiple vehicle cyber-attack detection system comprising:
    at least one vehicle operations center communicably coupled to and configured to monitor a plurality of vehicles, where each of the at least one vehicle operations center comprises a respective cyber-attack alert module;
    a vehicle cyber-attack detection system in communication with each of the at least one vehicle operations center, the vehicle cyber-attack detection system comprising:
        at least one first tier security module being coupled to at least one onboard system of each vehicle of the plurality of vehicles and being configured so as to receive system log data generated by the at least one onboard system, the at least one first tier security module being configured to extract extracted features from a time series of overlapping windowed system log data generated from the system log data with natural language processing and including
            a first cyber-attack anomaly detection module configured to identify a first cyber-attack based on system entropy measurements determined by the first cyber-attack anomaly detection module from the extracted features, and
            a second cyber-attack anomaly detection module that includes a deep learning component configured to identify a second cyber-attack based on classification of the extracted features with a deep learning component of the at least one first tier security module; and
    each respective cyber-attack alert module is coupled to the at least one first tier security module and includes a respective user interface, each respective cyber-attack alert module being configured to generate a notification of one or more of the first cyber-attack and the second cyber-attack on the respective user interface to effect cyber-attack diagnostics and remediation by vehicle personnel.

2. The multiple vehicle cyber-attack detection system of claim 1, wherein the plurality of vehicles comprises vehicles manufactured by but one vehicle manufacturer.

3. The multiple vehicle cyber-attack detection system of claim 1, wherein the plurality of vehicles comprises one or more fleets of vehicles operated by one or more airlines.

4. The multiple vehicle cyber-attack detection system of claim 1, wherein the at least one vehicle operations center communicably coupled to and configured to monitor airports at which the plurality of vehicles operate.

5. The multiple vehicle cyber-attack detection system of claim 1, wherein the extracted features include a first group of extracted features for the first cyber-attack anomaly detection module and a second group of extracted features for the second cyber-attack anomaly detection module, where the first group of extracted features is different than the second group of extracted features.

6. The multiple vehicle cyber-attack detection system of claim 1, further comprising:
    at least one second tier security module coupled to the at least one first tier security module and each respective cyber-attack alert module, the at least one second tier security module being coupled to at least a vehicle operator database of the at least one vehicle operations center and being configured to correlate one or more of the first cyber-attack and the second cyber-attack with vehicle operational data to identify at least one cyber-attack trend; and
    each respective cyber-attack alert module being configured to generate another notification of the at least one cyber-attack trend on the respective user interface to effect the cyber-attack diagnostics and remediation by the vehicle personnel.

7. The multiple vehicle cyber-attack detection system of claim 1, wherein the at least one first tier security module comprises a respective first tier security module for each vehicle in at least one fleet of vehicles.

8. The multiple vehicle cyber-attack detection system of claim 1, wherein the at least one first tier security module comprises a respective first tier security module for a respective vehicle that is configured so as to be added or removed from the vehicle cyber-attack detection system depending on an addition or removal of the respective vehicle in the plurality of vehicles.

9. The multiple vehicle cyber-attack detection system of claim 1, wherein the first cyber-attack anomaly detection module is configured to:
generate, from the system log data the time series of overlapping windowed system log data, where each window of the overlapping windowed system log data includes a respective batch of system log data;
extract the extracted features from the respective batch of system log data from at least one window of the overlapping windowed system log data; and
determine the system entropy measurements from the extracted features extracted from the respective batch of system log data from the at least one window of the overlapping windowed system log data.

10. A multiple vehicle cyber-attack detection system comprising:
at least one vehicle operations center communicably coupled to and configured to monitor a plurality of vehicles, where each of the at least one vehicle operations center comprises a respective cyber-attack alert module;
a vehicle cyber-attack detection system in communication with each of the at least one vehicle operations center, the vehicle cyber-attack detection system comprises a hierarchical arrangement of cyber-attack detection modules that includes
at least one first tier security module coupled to at least one onboard system of each vehicle of the plurality of vehicles and being configured so as to receive system log data generated by the at least one onboard system, the at least one first tier security module being configured to extract extracted features from a time series of overlapping windowed system log data generated from the system log data with natural language processing for one or more of behavior based cyber-attack detection and classification based cyber-attack detection with a deep learning component of the at least one first tier security module, where the at least one first tier security module includes:
a first cyber-attack anomaly detection module configured to identify a first cyber-attack based on system entropy measurements determined by the first cyber-attack anomaly detection module from the extracted features, and
a second cyber-attack anomaly detection module that includes the deep learning component configured to identify a second cyber-attack based on the classification of the extracted features, and
at least one second tier security module coupled to the at least one first tier security module and at least a vehicle operator database of the at least one vehicle operations center and being configured to correlate a cyber-attack identified by the at least one first tier security module with vehicle operational data to identify at least one cyber-attack trend; and
each respective cyber-attack alert module being coupled to one or more of the at least one first tier security module and the at least one second tier security module, each respective cyber-attack alert module includes a respective user interface and is configured to generate one or more of a notification of one or more of the cyber-attack identified by the at least one first tier security module and the at least one cyber-attack trend identified by the at least one second tier security module on the respective user interface to effect cyber-attack diagnostics and remediation by vehicle personnel.

11. The multiple vehicle cyber-attack detection system of claim 10, wherein the first cyber-attack and the second cyber-attack comprise a same type of cyber-attack.

12. The multiple vehicle cyber-attack detection system of claim 10, wherein the first cyber-attack comprises a first type of cyber-attack and the second cyber-attack comprises a second type of cyber-attack that is different than the first type of cyber-attack.

13. The multiple vehicle cyber-attack detection system of claim 10, wherein the first cyber-attack anomaly detection module is configured to:
generate, from the system log data the time series of overlapping windowed system log data, where each window of the overlapping windowed system log data includes a respective batch of system log data; extract the extracted features from the respective batch of system log data from at least one window of the overlapping windowed system log data; and determine the system entropy measurements from the extracted features extracted from the respective batch of system log data from the at least one window of the overlapping windowed system log data.

14. The multiple vehicle cyber-attack detection system of claim 10, wherein the at least one second tier security module is coupled to the at least one first tier security module so that data transfer from the at least one first tier security module to the at least one second tier security module is an asynchronous communication.

15. The vehicle cyber-attack detection system of claim 10, wherein the extracted features comprise a normalization of at least some of the system log data.

16. A method for vehicle cyber-attack detection using a multiple vehicle cyber-attack detection system, the method comprising:
receiving, with at least one first tier security module coupled to at least one onboard system of a respective vehicle in a plurality of vehicles, system log data generated by the at least one onboard system of the respective vehicle;
extracting, with the at least one first tier security module, extracted features from a time series of overlapping windowed system log data generated from the system log data with natural language processing;
identifying a first cyber-attack, with a first cyber-attack anomaly detection module of the at least one first tier security module, based on system entropy measurements determined by the first cyber-attack anomaly detection module from the extracted features extracted from the time series of overlapping windowed system log data;
identifying a second cyber-attack, with a second cyber-attack anomaly detection module of the at least one first tier security module that includes a deep learning component, based on classification of the extracted features; and
generating a notification of one or more of the first cyber-attack and the second cyber-attack on a respective user interface of a respective cyber-attack alert module of at least one vehicle operations center, the at least one vehicle operations center is communicably coupled to and configured to monitor the plurality of vehicles, each respective cyber-attack alert module is coupled to the at least one first tier security module to effect cyber-attack diagnostics and remediation by vehicle personnel.

17. The method of claim 16, further comprising:
correlating, with at least one second tier security module coupled to the at least one first tier security module, the respective cyber-attack alert module, and at least a vehicle operator database, one or more of the first cyber-attack and the second cyber-attack with vehicle operational data to identify at least one cyber-attack trend; and
generating, with the respective cyber-attack alert module, another notification of the at least one cyber-attack trend on the respective user interface to effect the cyber-attack diagnostics and remediation by the vehicle personnel.

18. The method of claim 17, wherein data transfer from the at least one first tier security module to the at least one second tier security module is an asynchronous communication.

19. The method of claim 16, further comprising, with the first cyber-attack anomaly detection module:
generating, from the system log data the time series of overlapping windowed system log data, where each window of the overlapping windowed system log data includes a respective batch of system log data;
extracting the extracted features from the respective batch of system log data from at least one window of the overlapping windowed system log data; and
determining the system entropy measurements from the extracted features extracted from the respective batch of system log data from the at least one window of the overlapping windowed system log data.

20. The multiple vehicle cyber-attack detection system of claim 10, wherein the plurality of vehicles comprises vehicles manufactured by but one vehicle manufacturer.

* * * * *